(12) United States Patent
Kim et al.

(10) Patent No.: US 12,504,211 B2
(45) Date of Patent: Dec. 23, 2025

(54) AIR CONDITIONER

(71) Applicant: LG ELECTRONICS INC., Seoul (KR)

(72) Inventors: Daehyoung Kim, Seoul (KR); Yongcheol Sa, Seoul (KR); Jiyoung Jang, Seoul (KR); Chiwoo Song, Seoul (KR); Jisung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 184 days.

(21) Appl. No.: 18/380,267

(22) Filed: Oct. 16, 2023

(65) Prior Publication Data

US 2024/0133602 A1 Apr. 25, 2024
US 2024/0230190 A9 Jul. 11, 2024

(30) Foreign Application Priority Data

Oct. 25, 2022 (KR) .................. 10-2022-0138145

(51) Int. Cl.
*F25B 49/02* (2006.01)
*F25B 13/00* (2006.01)

(52) U.S. Cl.
CPC .............. *F25B 49/02* (2013.01); *F25B 13/00* (2013.01); *F25B 2313/007* (2013.01);
(Continued)

(58) Field of Classification Search
CPC .... F25B 49/02; F25B 13/00; F25B 2313/007; F25B 2313/0233; F25B 2313/0291;
(Continued)

(56) References Cited

U.S. PATENT DOCUMENTS

2021/0131706 A1* 5/2021 Yamada ................... F24F 11/49

FOREIGN PATENT DOCUMENTS

EP 2851633 3/2015
EP 3940315 1/2022
(Continued)

OTHER PUBLICATIONS

European Search Report dated Mar. 19, 2024, issued in Application No. 23204244.0.
(Continued)

*Primary Examiner* — Nael N Babaa
(74) *Attorney, Agent, or Firm* — KED & ASSOCIATES

(57) ABSTRACT

An air conditioner may include a controller; a compressor; an outdoor heat exchanger; a plurality of indoor heat exchangers; a switching valve that selectively guides a refrigerant discharged from the compressor to the outdoor heat exchanger or the plurality of indoor heat exchangers; high pressure pipes that connect the switching valve and the plurality of indoor heat exchangers; high pressure valves installed in the high pressure pipes; low pressure pipes that connect an inlet of the compressor and the high pressure pipes. low pressure valves installed in the low pressure pipes; indoor pipes, which are opposite to the high pressure pipes with respect to the plurality of indoor heat exchangers and connected to the plurality of indoor heat exchangers; indoor expansion valves installed in the indoor pipes; a liquid pipe that connects the outdoor heat exchanger and the indoor pipes; and an outdoor expansion valve installed in the liquid pipe.

20 Claims, 13 Drawing Sheets

(52) U.S. Cl.
CPC ............... *F25B 2313/0233* (2013.01); *F25B 2313/0291* (2013.01); *F25B 2313/0292* (2013.01); *F25B 2600/2513* (2013.01); *F25B 2700/1933* (2013.01)

(58) Field of Classification Search
CPC ...... F25B 2313/0292; F25B 2600/2513; F25B 2700/1933
USPC .......................................................... 62/160
See application file for complete search history.

(56) References Cited

FOREIGN PATENT DOCUMENTS

| | | |
|---|---|---|
| EP | 4012294 | 6/2022 |
| JP | 4-186047 | 7/1992 |
| KR | 10-2004-0045095 | 6/2004 |
| KR | 10-2022-0019933 | 2/2022 |
| WO | WO 2021/124458 | 6/2021 |

OTHER PUBLICATIONS

Korean Office Action issued in Application No. 10-2022-0138145 dated Dec. 19, 2024.

\* cited by examiner

AIR CONDITIONER

CROSS-REFERENCE TO RELATED APPLICATION(S)

This application claims priority from Korean Patent Application No. 10-2022-0138145, filed in Korea on Oct. 25, 2022, in the Korean Intellectual Property Office, the disclosure of which is incorporated herein by reference in its entirety.

BACKGROUND

1 Field

An air conditioner is disclosed herein.

2. Background

In general, an air conditioner refers to a device that heats or cools a room through processes of compression, condensation, expansion, and evaporation of a refrigerant. When an air conditioner includes a plurality of indoor heat exchangers, respective indoor spaces may be simultaneously heated and cooled. In addition, it is possible to switch an operation mode of the air conditioner. That is, a heating operation may be switched to a cooling operation, or the cooling operation may be switched to the heating operation.

In addition, a cooling main operation may be switched to a heating main operation, or the heating main operation may be switched to the cooling main operation. The cooling main operation is an operation that is performed when a cooling load is greater than a heating load, and the heating main operation is an operation that is performed when the heating load is greater than the cooling load.

KR10-2004-0045095 (published on Jun. 1, 2004), which is hereby incorporated by reference, discloses technology for lowering a condensing pressure of a system by operating an outdoor fan for a certain period of time even when a compressor is stopped, in order to reduce noise generated by a pressure difference between refrigerant at front and rear ends of a switching valve when switching an operation mode. However, as there is a limit in lowering a condensing pressure of a system by discharging heat outdoors, and still maintaining an evaporating pressure of the system, it is difficult to effectively reduce the pressure difference between the refrigerant at the front and rear ends of the switching valve.

BRIEF DESCRIPTION OF THE DRAWINGS

Embodiments will be described in detail with reference to the following drawings in which like reference numerals refer to like elements, and wherein.

DETAILED DESCRIPTION

Description will now be given according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

Hereinafter, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, embodiments should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

Herein, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

Figure 1:
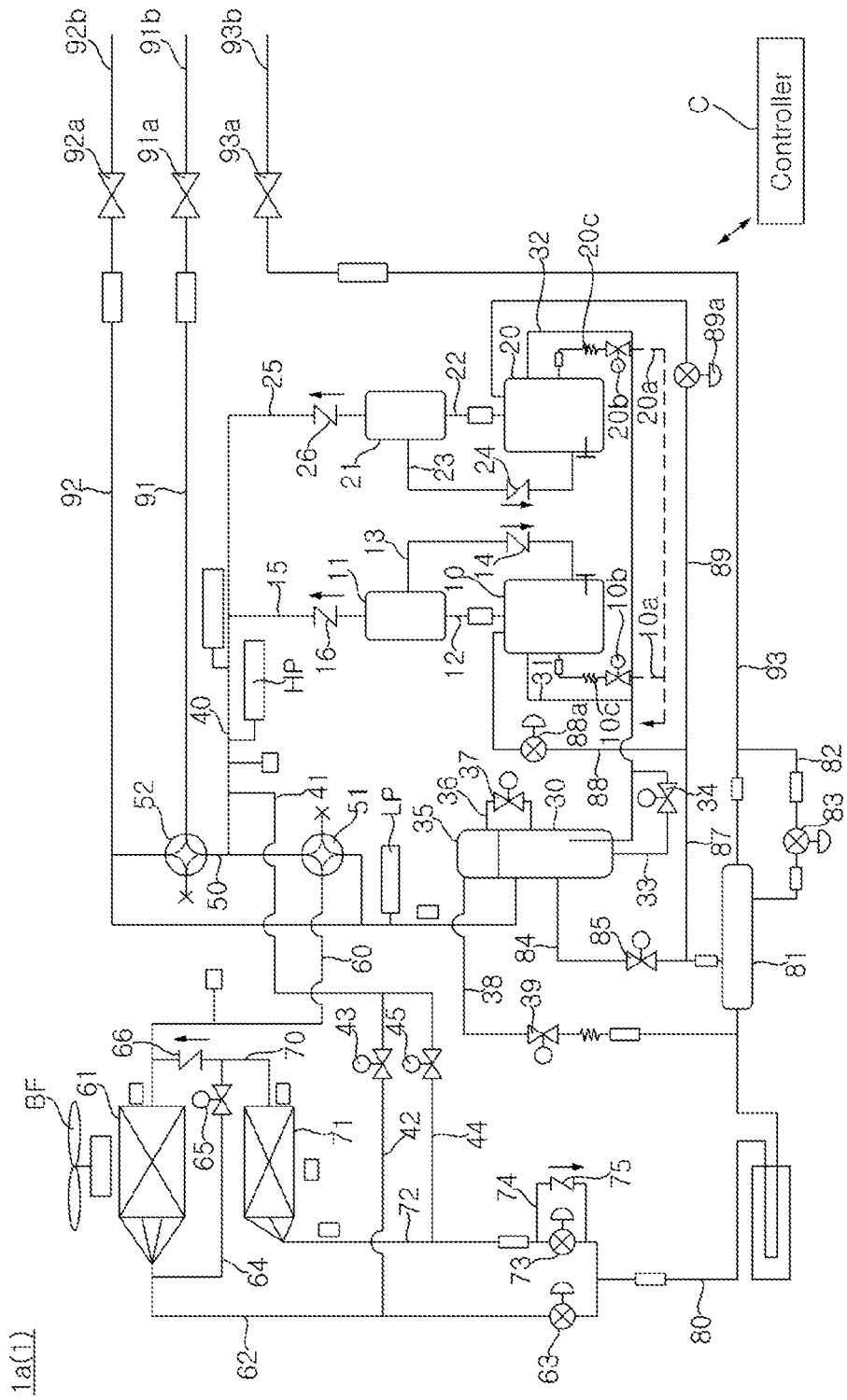
FIG. 1 is a schematic diagram of an outdoor unit of an air conditioner according to an embodiment.
Figure 2:
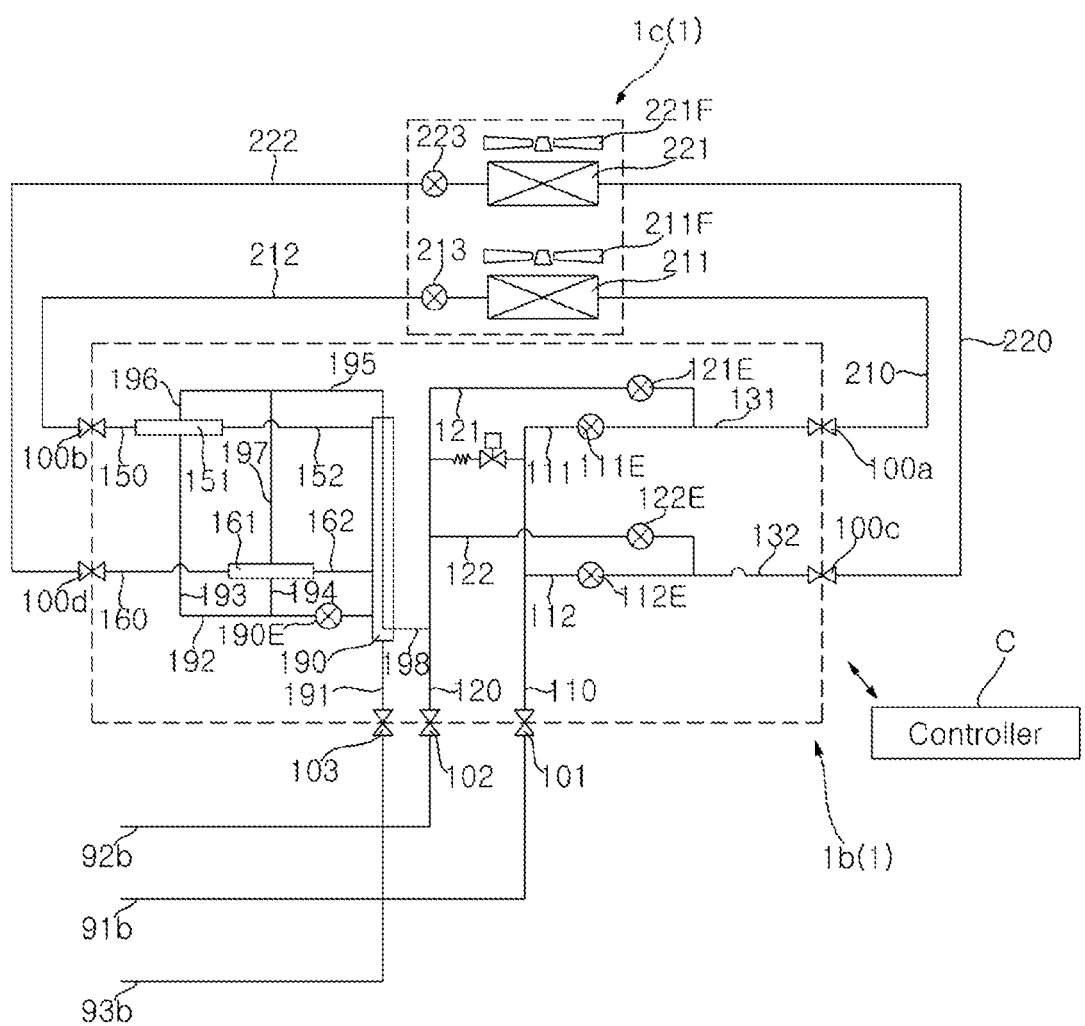
FIG. 2 is a schematic diagram of an indoor unit of an air conditioner according to an embodiment.

Referring to FIGS. 1 and 2, an air conditioner 1 may include an outdoor unit 1a, a heat recovery unit 1b, and an indoor unit 1c. The outdoor unit 1a may include a compressor 10, 20, an oil separator 11, 21, an accumulator 30, a switching valve 51, 52, an outdoor heat exchanger 61, 71, and an outdoor expansion valve 63, 73.

The compressor 10, 20 may compress and discharge refrigerant at a high temperature and high pressure. The compressor 10, 20 may be an inverter compressor capable of controlling an amount of refrigerant and a discharge pressure of the refrigerant by adjusting an operating frequency. For example, the compressor 10, 20 may include first compressor 10 and second compressor 20. Alternatively, the number of compressors 10, 20 may be one, three, or more.

The oil separator 11, 21 may be connected to the compressor 10, 20 through a refrigerant pipe 12, 22 and an oil recovery pipe 13, 23. The refrigerant discharged from the first compressor 10 may flow into first oil separator 11 through first refrigerant pipe 12, and the oil flowing into the first oil separator 11 may be returned to the first compressor 10 through first oil recovery pipe 13. A first check valve 14 may be installed in the first oil recovery pipe 13, and fluid in the first oil recovery pipe 13 may flow from the first oil separator 11 to the first compressor 10. The refrigerant discharged from the second compressor 20 may flow into second oil separator 21 through second refrigerant pipe 22, and the oil flowing into the second oil separator 21 may be returned to the second compressor 20 through second oil recovery pipe 23. A second check valve 24 may be installed in the second oil recovery pipe 23, and fluid in the second oil recovery pipe 23 may flow from the second oil separator 21 to the second compressor 20.

The refrigerant passing through the first oil separator 11 may flow through a first refrigerant pipe 15 in which a first check valve 16 is installed, and the refrigerant passing through the second oil separator 21 may flow through a second refrigerant pipe 25 in which a second check valve 16 is installed. The refrigerant passing through the first refrigerant pipe 15 and the second refrigerant pipe 25 may flow through a discharge pipe 40, 50.

The accumulator 30 may provide gaseous refrigerant to the compressor 10, 20 through a refrigerant pipe 31, 32. One or a first end of the oil recovery pipe 33 may be connected to the accumulator 30, and the other or a second end of the oil recovery pipe 33 may be connected to the refrigerant pipe 31, 32. A control valve 34 may be installed in the oil recovery pipe 33 and may control a flow of oil in the oil recovery pipe 33.

The switching valve 51, 52 may switch a flow path of the refrigerant according to an operation mode of the air conditioner. The switching valve 51, 52 may be a four-way valve.

First switching valve 51 may be connected to the discharge pipe 40, 50, a first connection pipe 60, a low pressure pipe 92, and a closed pipe (see "X" near the first switching valve 51 in FIG. 1). The first connection pipe 60 may connect the first switching valve 51 and first outdoor heat exchanger 61, and the low pressure pipe 92 may provide low pressure refrigerant which has passed through the evaporator to the accumulator 30. The first switching valve 51 in a first state may guide the refrigerant in the discharge pipe 40, 50 to the first connection pipe 60 (see the solid line of the first switching valve 51 in FIG. 1). The first switching valve 51 in a second state switched from the first state may guide the refrigerant in the first connection pipe 60 to the low pressure pipe 92 (see the dotted line of first switching valve 51 in FIG. 1). The first connection pipe 60 may be referred to as connection pipe 60.

Second switching valve 52 may be connected to the discharge pipe 40, 50, a high pressure pipe 91, the low pressure pipe 92, and the closed pipe (see "X" near the second switching valve 52 in FIG. 1). The second switching valve 52 may guide the refrigerant in the discharge pipe 40, 50 to the high pressure pipe 91.

The outdoor heat exchanger 61, 71 may include a pipe through which refrigerant flows, and may exchange heat between a refrigerant and a heat transfer medium. A heat transfer direction between the refrigerant and the heat transfer medium in the outdoor heat exchanger 61, 71 may be different depending on the operation mode of the air conditioner. When the outdoor heat exchanger 61, 71 serves as a condenser, heat may be transferred from the refrigerant passing through the outdoor heat exchanger 61, 71 to the heat transfer medium, and the refrigerant may be condensed. When the outdoor heat exchanger 61, 71 serves as an evaporator, heat may be transferred from the heat transfer medium to the refrigerant passing through the outdoor heat exchanger 61, 71, and the refrigerant may be evaporated. For example, the heat transfer medium may be outdoor air. In this case, an outdoor fan BF may cause air to flow through the outdoor heat exchanger 61, 71. The number of outdoor heat exchanger 61, 71 may be one or two or more.

One or a first end of the first outdoor heat exchanger 61 may be connected to the first connection pipe 60, and the other or a second end of the first outdoor heat exchanger 61 may be connected to a first outdoor pipe 62. One or a first end of a variable bypass pipe 64 may be connected to the first outdoor pipe 62, and the other or a second end of the variable bypass pipe 64 may be connected to the first connection pipe 60. A variable valve 65 may be installed in the variable bypass pipe 64. A check valve 66 may be installed in the variable bypass pipe 64 at a location between the variable valve 65 and the other end of the variable bypass pipe 64, and may block the refrigerant in the first connection pipe 60 from passing through the variable bypass pipe 64.

One or a first end of the second outdoor heat exchanger 71 may be connected to the variable bypass pipe 64 at a position between the variable valve 65 and the check valve 66 through a second connection pipe 70. The other or a second end of the second outdoor heat exchanger 71 may be connected to the second outdoor pipe 72. One or a first end and the other or a second end of a bypass pipe 74 may be connected to the second outdoor pipe 72, and the check valve 75 may be installed in the bypass pipe 74. The second connection pipe 70 may be referred to as a connection pipe 70.

The outdoor expansion valve 63, 73 may include first outdoor expansion valve 63 and second outdoor expansion valve 73. The first outdoor expansion valve 63 may be installed in the first outdoor pipe 62 and may expand the refrigerant flowing through the first outdoor pipe 62. The second outdoor expansion valve 73 may be installed in the second outdoor pipe 72 and expand the refrigerant flowing through the second outdoor pipe 72. The outdoor expansion valves 63, 73 may each be an Electronic Expansion Valve (EEV).

A supercooling pipe 80 may connect the outdoor expansion valve 63, 73 and a supercooler 81. A liquid pipe 93 may be opposite to the supercooling pipe 80 with respect to the supercooler 81, and may be connected to the supercooler 81. One or a first end of a supercooling bypass pipe 82 may be connected to the liquid pipe 93, and the other or a second end of the supercooling bypass pipe 82 may be connected to the supercooler 81.

A part or portion of the refrigerant in the liquid pipe 93 may be expanded by a supercooling expansion valve 83 installed in the bypass pipe 82 and may pass through the supercooler 81. The refrigerant evaporated while passing through the supercooler 81 may be supplied to the compressor 10, 20 through a refrigerant pipe 87, 88, 89. An expansion valve 88a, 89a may be installed in the refrigerant pipe 88, 89 to expand the refrigerant passing through the refrigerant pipe 88, 89. A bypass pipe 84 in which a bypass valve 85 is installed may have one or a first end connected to the accumulator 30 and the other or a second end connected to the refrigerant pipe 87. When the bypass valve 85 is opened, liquid refrigerant in the accumulator 30 may be expanded by the expansion valve 88a, 89a in the refrigerant pipe 87, 88, 89 and flow into the compressor 10, 20. The supercooling expansion valve 83 and the expansion valve 88a, 89a may each be an electronic expansion valve (EEV).

The rest of the refrigerant in the liquid pipe 93 may be supercooled while passing through the supercooler 81. The supercooled refrigerant may pass through the supercooling pipe 80.

A receiver 35 may store refrigerant. A first receiver connection pipe 36 may connect the receiver 35 and the accumulator 30, and a first valve 37 may be installed in the first receiver connection pipe 36 and be opened or closed. A second receiver connection pipe 38 may connect the receiver 35 and the supercooling pipe 80, and a second valve 39 may be installed in the second receiver connection pipe 38 and be opened or closed. The first and second valves 37 and 39 may adjust an amount of refrigerant circulated through the refrigerant pipe.

The indoor unit 1c may include an indoor heat exchanger 211, 221 and an indoor expansion valve 213, 223. The indoor heat exchanger 211, 221 may include a pipe through which the refrigerant flows, and may exchange heat between the refrigerant and the heat transfer medium. The direction of heat transfer between the refrigerant and the heat transfer medium in the indoor heat exchanger 211, 221 may vary depending on the operation mode of the air conditioner. When the indoor heat exchanger 211, 221 serves as an evaporator, heat may be transferred from the heat transfer medium to the refrigerant passing through the indoor heat exchanger 211, 221, and the refrigerant may be evaporated. When the indoor heat exchanger 211, 221 serves as an condenser, heat may be transferred from the refrigerant passing through the indoor heat exchanger 211, 221 to the heat transfer medium, and the refrigerant may be condensed. For example, the heat transfer medium may be indoor air. In this case, an indoor fan 211F, 221F may cause air to flow through the indoor heat exchanger 211, 221. For another example, the heat transfer medium may be water. In this case, the water passing through the indoor heat exchanger 211, 221 may be supplied to a radiator or pipe installed in a room to cool or heat the room, or may be supplied to a water tank to provide cold or hot water to the room. The number of indoor heat exchanger 211, 221 may be one, or two or more.

One or a first end of a first indoor heat exchanger 211 may be connected to a first connection pipe 210, and the other or a second end of the first indoor heat exchanger 211 may be connected to a first indoor pipe 212. One or a first end of a second indoor heat exchanger 221 may be connected to a second connection pipe 220, and the other or a second end of the second indoor heat exchanger 221 may be connected to a second indoor pipe 222.

The indoor expansion valve 213, 223 may include first indoor expansion valve 213 and second indoor expansion valve 223. The first indoor expansion valve 213 may be installed in the first indoor pipe 212 and expand the refrigerant flowing through the first indoor pipe 212. The second indoor expansion valve 223 may be installed in the second indoor pipe 222, and may expand the refrigerant flowing through the second indoor pipe 222. The indoor expansion valve 213, 223 may be an electronic expansion valve (EEV).

The heat recovery unit 1b may connect the outdoor unit 1a and the indoor unit 1c through a refrigerant pipe. The heat recovery unit 1b may include a distributor and a supercooler.

A high pressure connection pipe 91b may be connected to the high pressure pipe 91 of the outdoor unit 1a through a first connection valve 91a, and may be connected to a high pressure pipe 110 of the heat recovery unit 1b through a second connection valve 101. The high pressure pipe 91, the high pressure connection pipe 91b, and the high pressure pipe 110 may be a gas pipe through which high pressure gaseous refrigerant flows. A first high pressure valve 111E may be installed in a first high pressure pipe 111 of the high pressure pipe 110, and an opening degree of the first high pressure valve 111E may be adjusted. A second high pressure valve 112E may be installed in the second high pressure pipe 112 of the high pressure pipe 110, and an opening degree of the second high pressure valve 112E may be adjusted. The first and second high pressure valves 111E and 112E may each be an electronic expansion valve (EEV). The first and second high pressure valves 111E and 112E may each be a large-capacity EEV having a large flow coefficient. The first and second high pressure pipes 111 and 112 may be referred to as first and second refrigerant pipes 111 and 112. The first and second high pressure valves 111E and 112E may be referred to as first and second control valves 111E and 112E.

A low pressure connection pipe 92b may be connected to the low pressure pipe 92 of the outdoor unit 1a through a first connection valve 92a, and may be connected to a low pressure pipe 120 of the heat recovery unit 1b through a second connection valve 102. The low pressure pipe 92, the low pressure connection pipe 92b, and the low pressure pipe 120 may be a gas pipe through which low pressure gaseous refrigerant flows. A first low pressure valve 121E may be installed in a first low pressure pipe 121 of the low pressure pipe 120, and an opening degree of the first low pressure valve 121E may be adjusted. A second low pressure valve 122E may be installed in a second low pressure pipe 122 of the low pressure pipe 120, and an opening degree of the second low pressure valve 122E may be adjusted. The first and second low pressure valves 121E and 122E may each be an electronic expansion valve (EEV). The first and second low pressure valves 121E and 122E may each be a large-capacity EEV having a large flow coefficient. The first and second low pressure pipes 121 and 122 may be referred to as first and second connection pipes 121 and 122. The first and second low pressure valves 121E and 122E may be referred to as first and second variable valves 121E and 122E. The number of each of the high pressure valve 111E, 112E and the low pressure valve 121E, 122E may be the same as the number of indoor heat exchanger 211, 221. The number of indoor heat exchanger 211, 221 may be one, or two or more.

A liquid connection pipe 93b may be connected to the liquid pipe 93 of the outdoor unit 1a through a first connection valve 93a, and may be connected to a liquid pipe 191 of the heat recovery unit 1b through a second connection valve 103. The liquid pipe 93, the liquid connection pipe 93b, and the liquid pipe 191 may be a liquid pipe through which medium pressure liquid refrigerant flows.

The first high pressure pipe 111 of the high pressure pipe 110 and the first low pressure pipe 121 of the low pressure pipe 120 may be connected to a first refrigerant pipe 131. The first refrigerant pipe 131 may be connected to the first connection pipe 210 through a first valve 100a. The second high pressure pipe 112 of the high pressure pipe 110 and the second low pressure pipe 122 of the low pressure pipe 120 may be connected to a second refrigerant pipe 132. The second refrigerant pipe 132 may be connected to the second connection pipe 220 through a third valve 100c.

A supercooler 151, 161 may connect the indoor pipe 212, 222 and the liquid connection pipe 93b. One or a first end of a first supercooling pipe 150 may be connected to first supercooler 151, and the other or a second end of the first supercooling pipe 150 may be connected to the first indoor pipe 212 through a second valve 100b. A first pipe 152 may connect a header 190 and the first supercooler 151. One or a first end of a second supercooling pipe 160 may be connected to second supercooler 161, and the other or a second end of the second supercooling pipe 160 may be connected to the second indoor pipe 222 through a fourth valve 100d. A second pipe 162 may connect the header 190 and the second supercooler 161.

One or a first end of the liquid pipe 191 of the heat recovery unit 1b may be connected to the liquid connection pipe 93b through the second connection valve 103, and the other or a second end of the liquid pipe 191 of the heat recovery unit 1b may be connected to the header 190. One or a first end of a supercooling bypass pipe 192 may be connected to the header 190, and the other or a second end of the supercooling bypass pipe 192 may be connected to the supercooler 151, 161 (see reference numerals 193 and 194 in FIG. 2). A supercooling expansion valve 190E may be installed in the supercooling bypass pipe 192, and expand the refrigerant flowing through the supercooling bypass pipe 192. The supercooling expansion valve 190E may be an electronic expansion valve (EEV).

One or a first end of an evaporation pipe 195 of the heat recovery unit 1b may be connected to the supercooler 151, 161 (see reference numerals 196 and 197 in FIG. 2), and the other or a second end of the evaporation pipe 195 may be connected to the low pressure pipe 120.

Accordingly, a part or portion of the refrigerant in the liquid pipe 191 flows through the supercooling bypass pipe 192, and may be expanded by the supercooling expansion valve 190E, and evaporated while passing through the supercooler 151, 161. The evaporated refrigerant may be provided to the low pressure pipe 120 via the evaporation pipe 195 and the header 190. The rest of the refrigerant in the liquid pipe 191 may flow through the pipe 152, 162 and may be cooled while passing through the supercooler 151, 161. The cooled refrigerant may be supplied to the indoor heat exchanger 211, 221 via the supercooling pipe 150, 160, the indoor pipe 212, 222, and the indoor expansion valve 213, 223.

Figure 3A:
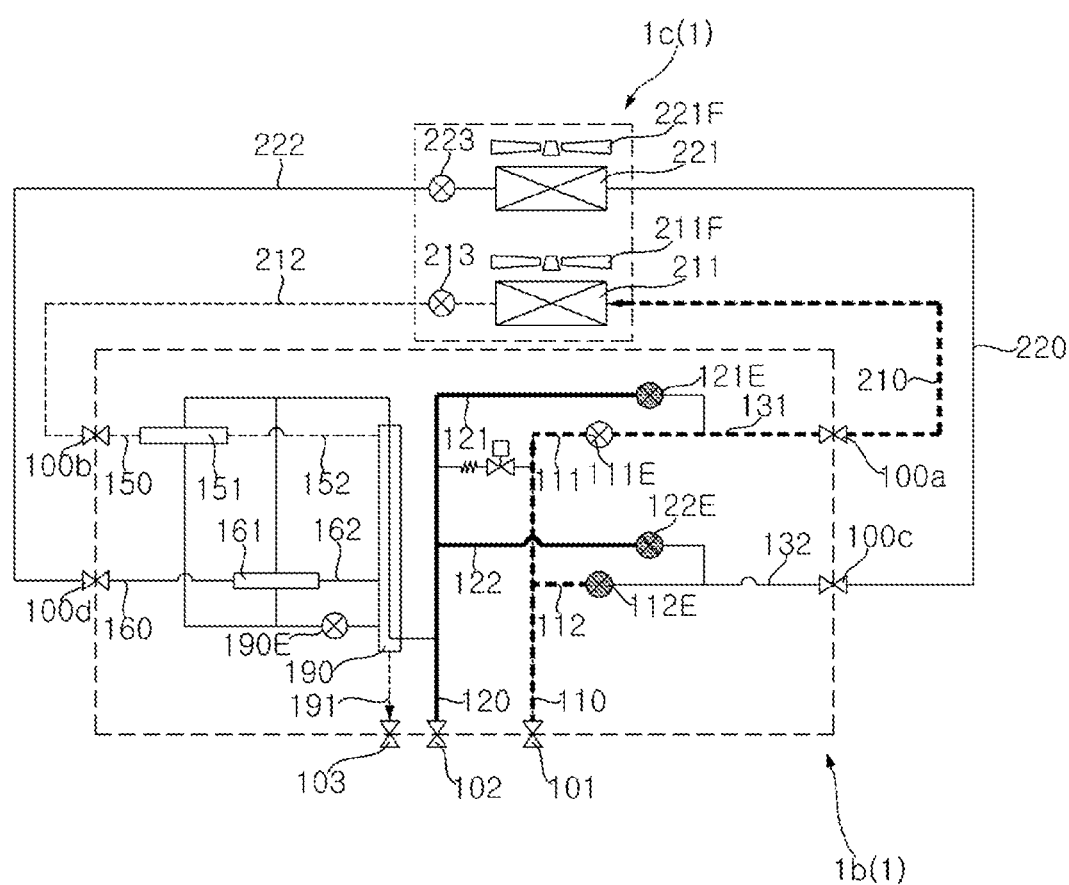
FIGS. 3A and 3B are diagrams for explaining a heating operation and a cooling operation of an air conditioner according to an embodiment.
Figure 3B:
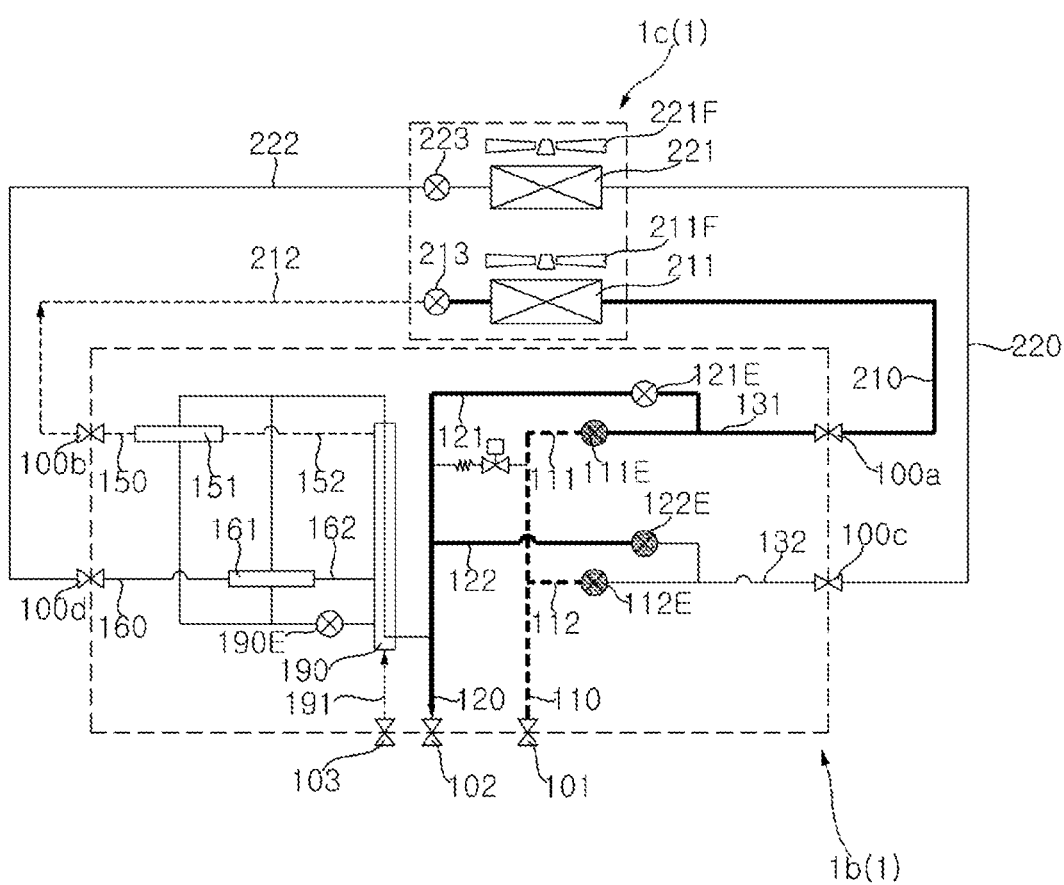

Referring to FIG. 3, the air conditioner may perform a heating operation (see FIG. 3A)) or a cooling operation (see FIG. 3B). For example, the indoor heat exchanger(s) may serve as a condenser or an evaporator. As another example, among the indoor heat exchangers, an indoor heat exchanger installed in an indoor space requiring heating may serve as a condenser, and an indoor heat exchanger installed in an indoor space requiring cooling may serve as an evaporator. As another example, among indoor heat exchangers, an indoor heat exchanger installed in an indoor space requiring heating or cooling may serve as a condenser or an evaporator, and an indoor heat exchanger installed in an indoor space not requiring heating or cooling may be inoperative.

Referring to FIG. 3A, the first high pressure valve 111E and the first indoor expansion valve 213 may be opened. The first low pressure valve 121E, the second low pressure valve 122E, and the second high pressure valve 112E may be closed.

The high-temperature, high pressure refrigerant discharged from the compressor 10, 20 may flow into the high pressure pipe 110 (see FIGS. 1 and 2) via the oil separator 11, 21, the second switching valve 52, the high pressure pipe 91, and the high pressure connection pipe 91b. The refrigerant in the high pressure pipe 110 may flow into the first indoor heat exchanger 211 through the first high pressure valve 111E and the first valve 100a, and may be condensed while passing through the first indoor heat exchanger 211. Accordingly, the indoor space in which the first indoor heat exchanger 211 is installed may be heated. The first indoor expansion valve 213 may control a degree of supercooling. The degree of supercooling is a difference between a saturation temperature corresponding to the condensing pressure of the first indoor heat exchanger 211 and an outlet temperature of the first indoor heat exchanger 211.

The condensed refrigerant flows into the liquid pipe 93 via the first indoor expansion valve 213, the second valve 100b, the first supercooler 151, the header 190, and the liquid connection pipe 93b (see FIGS. 1 and 2). The refrigerant in the liquid pipe 93 may be cooled while passing through the supercooler 81, expanded by the outdoor expansion valve 63, 73, and evaporated while passing through the outdoor heat exchanger 61, 71.

The evaporated refrigerant may be returned to the compressor 10, 20 via the first connection pipe 60, the first switching valve 51, the low pressure pipe 92, and the accumulator 30. Accordingly, a heating cycle of the air conditioner using the first indoor heat exchanger 211 may be completed.

Referring to FIG. 3B, the first low pressure valve 121E and the first indoor expansion valve 213 may be opened. The first high pressure valve 111E, the second low pressure valve 122E, and the second high pressure valve 112E may be closed.

The high-temperature, high pressure refrigerant discharged from the compressor 10, 20 may flow into the first connection pipe 60 via the oil separator 11, 21 and the first switching valve 51, and the refrigerant in the first connection pipe 60 may be condensed while passing through the outdoor heat exchanger 61, 71 (see FIGS. 1 and 2). The condensed refrigerant may flow into the liquid pipe 191 via the outdoor expansion valve 63, 73, the supercooler 81, the liquid pipe 93, and the liquid connection pipe 93b (see FIGS. 1 and 2). The refrigerant in the liquid pipe 191 may be cooled while passing through the first supercooler 151, expanded while passing through the first indoor expansion valve 213, and evaporated while passing through the first indoor heat exchanger 211. Accordingly, the indoor space in which the first indoor heat exchanger 211 is installed may be cooled. The first indoor expansion valve 213 may control the degree of superheat. The degree of superheat is a difference between the temperature of the refrigerant suctioned into the compressor 10, 20 (or the temperature of the refrigerant at the outlet side of the first indoor heat exchanger 211) and a saturation temperature corresponding to the evaporating pressure of the first indoor heat exchanger 211 (or a temperature of the refrigerant at an inlet side of the first indoor heat exchanger 211).

The evaporated refrigerant may be returned to the compressor 10, 20 via the first valve 100a, the first low pressure valve 121E, the low pressure pipe 120, the low pressure connection pipe 92b, the low pressure pipe 92, and the accumulator 30. Accordingly, the cooling cycle of the air conditioner using the first indoor heat exchanger 211 may be completed.

Figure 4:
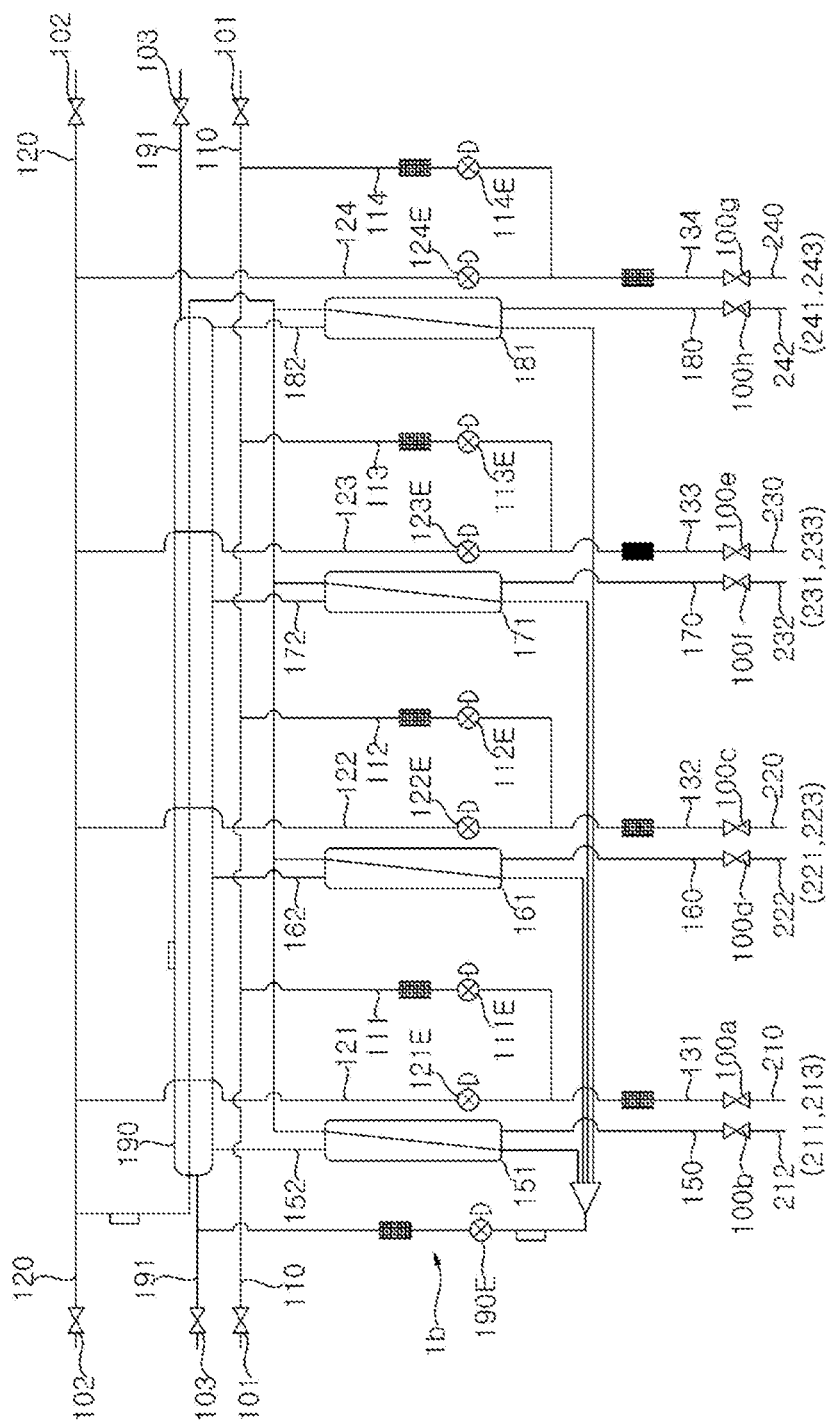
FIG. 4 is a schematic diagram for explaining an indoor unit having various numbers of indoor heat exchanger(s)
Figure 5:
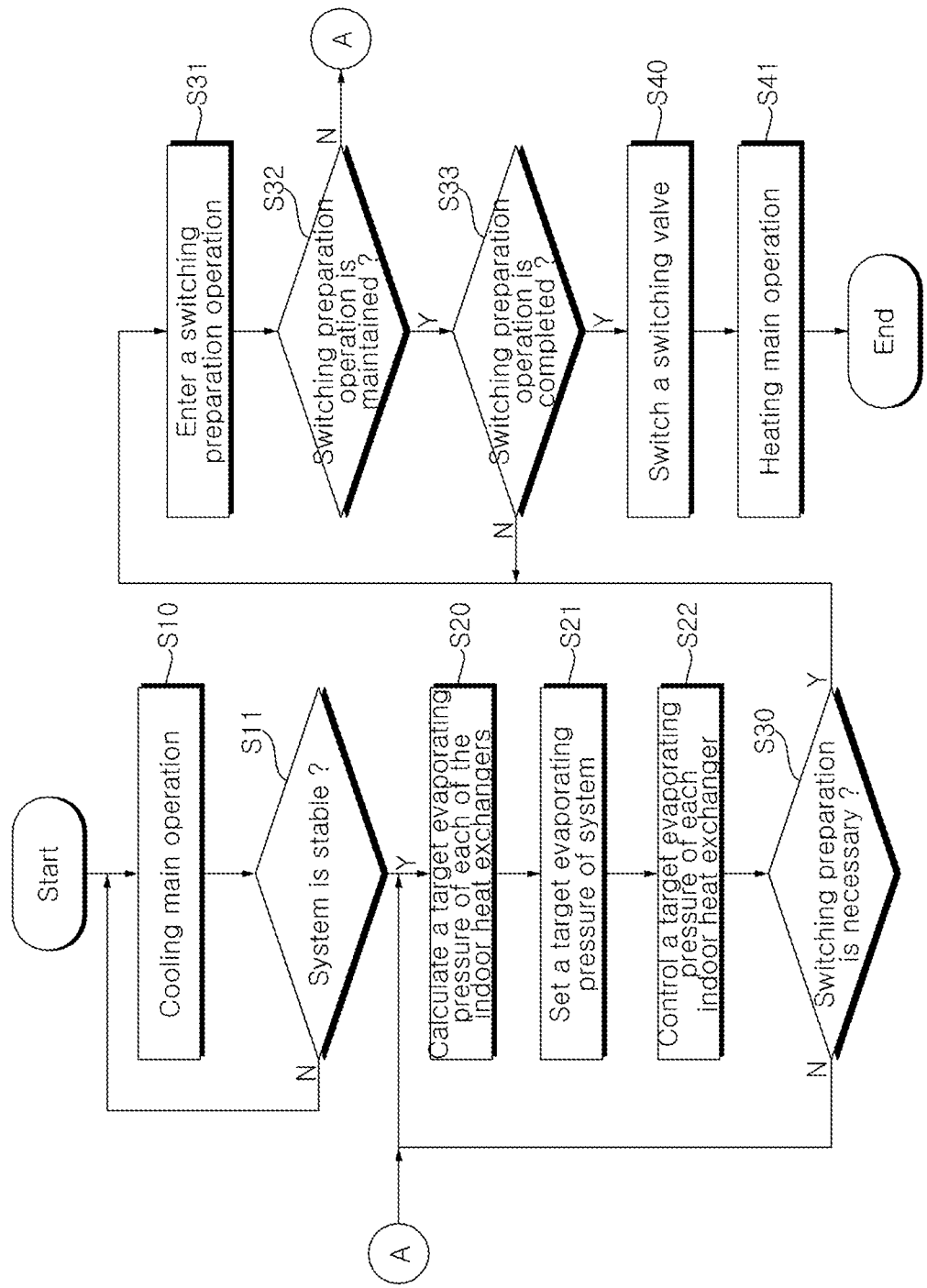
FIGS. 5 to 8 are a flow chart, graph, and schematic diagrams for explaining a method of switching from a cooling main operation to a heating main operation.
Figure 6:
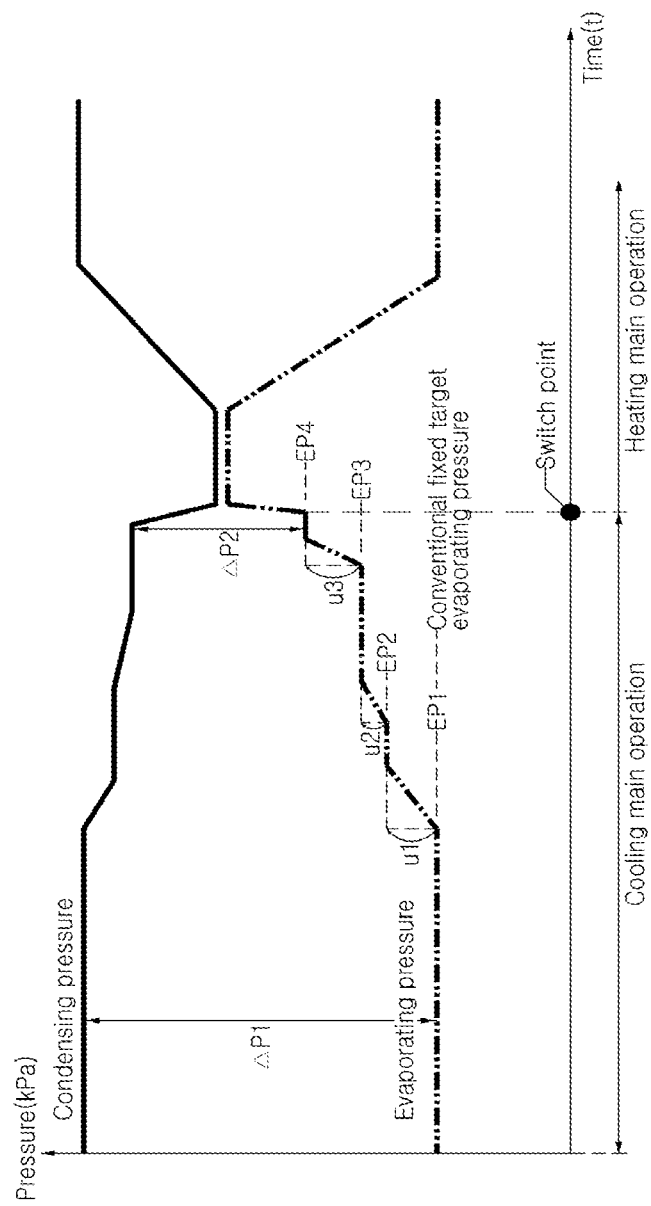
Figure 7:
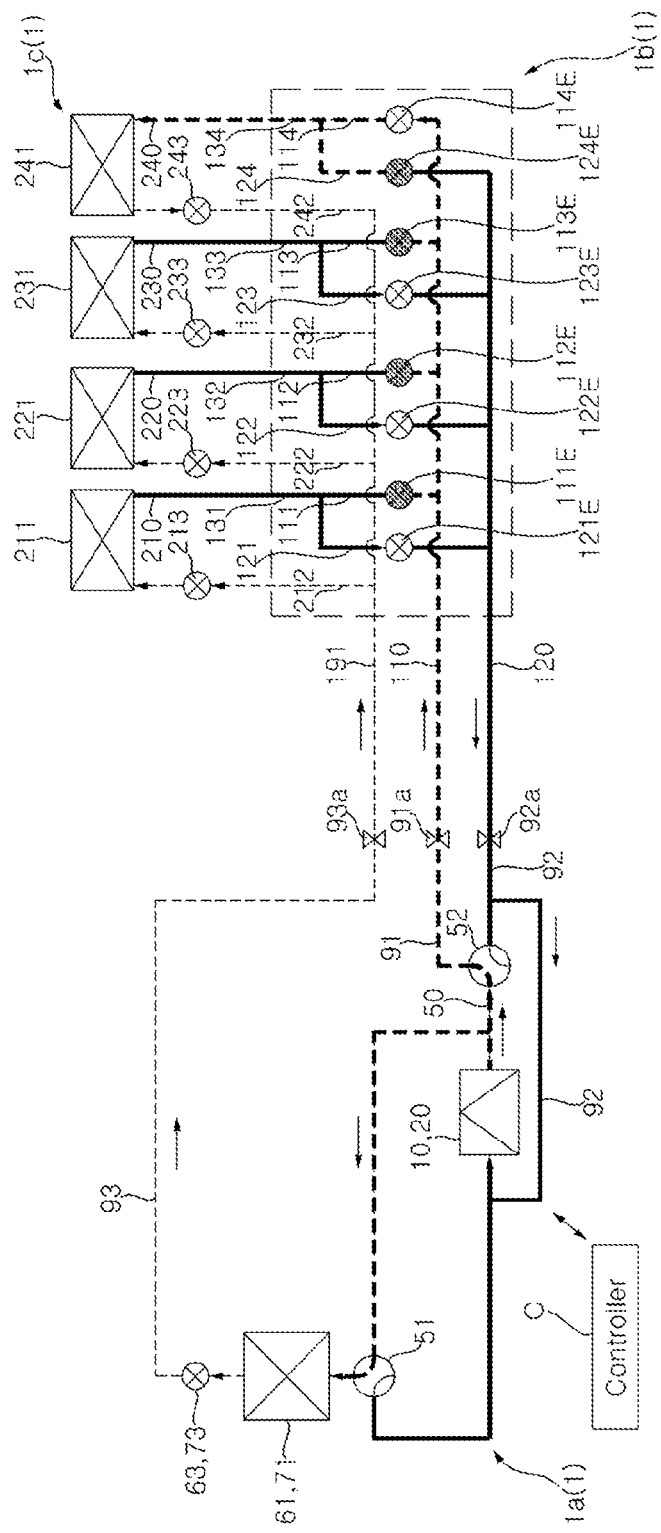

Referring to FIG. 4, four indoor heat exchangers 211, 221, 231, and 241 may be connected to the heat recovery unit 1b. For example, the air conditioner may perform a heating operation using four indoor heat exchangers 211, 221, 231, and 241. First to fourth high pressure valves 111E, 112E, 113E, and 114E may be opened, and first to fourth low pressure valves 121E, 122E, 123E, and 124E may be closed.

Further, the refrigerant of high pressure pipe 110 may flow into the first to fourth indoor heat exchangers 211, 221, 231, 241 through the first to fourth high pressure valves 111E, 112E, 113E, and 114E and first to fourth connection pipes 210, 220, 230, and 240, and may be condensed while passing through the first to fourth indoor heat exchangers 211, 221, 231, 241. Accordingly, the indoor space in which the first to fourth indoor heat exchangers 211, 221, 231, and 241 are installed may be heated. The condensed refrigerant may be provided to the liquid pipe 191 via the first to fourth indoor expansion valves 213, 223, 233, and 243, the first to fourth indoor pipes 212, 222, 232, and 242, and the first to fourth supercoolers 151, 161, 171, 181.

For example, the air conditioner may perform a heating operation using the first and second indoor heat exchangers 211 and 221, and perform a cooling operation using the third and fourth indoor heat exchangers 231 and 241. The first and second high pressure valves 111E and 112E may be opened, and the first and second low pressure valves 121E and 122E may be closed. The third and fourth low pressure valves 123E and 124E may be opened, and the third and fourth high pressure valves 113E and 114E may be closed.

In addition, the refrigerant of the high pressure pipe 110 may flow into the first and second indoor heat exchangers 211 and 221 through the first and second high pressure valves 111E and 112E and the first and second connection pipes 210 and 220, and may be condensed while passing through the first and second indoor heat exchangers 211 and 221. Thus, the indoor space in which the first and second indoor heat exchanger 211, 221 are installed may be heated. The condensed refrigerant may be provided to the liquid pipe 191 via the first and second indoor expansion valve 213 and 223, the first and second indoor pipes 212 and 222, and the first and second supercoolers 151 and 161.

In addition, the refrigerant in the liquid pipe 191 may be cooled while passing through third and fourth supercoolers 171 and 181. The cooled refrigerant may pass through third and fourth supercooling pipes 170 and 180 and third and fourth indoor pipes 232 and 242, be expanded by third and fourth indoor expansion valves 233 and 243, and be evaporated while passing through the third and fourth indoor heat exchangers 231 and 241. Thus, the indoor space in which the third and fourth indoor heat exchangers 231 and 241 are installed may be cooled. The evaporated refrigerant may be supplied to the low pressure pipe 120 via the third and fourth connection pipes 230 and 240 and the third and fourth low pressure valves 123E and 124E.

The air conditioner may perform a cooling operation using four indoor heat exchangers 211, 221, 231, and 241. Referring to FIGS. 5 to 8, the controller C of the air conditioner may perform a cooling main operation of the air conditioner (S10, see FIG. 7). The cooling main operation is an operation performed when a cooling load of the indoor heat exchanger serving as an evaporator among the plurality of indoor heat exchangers 211, 221, 231, and 241 is greater than a heating load of the indoor heat exchanger serving as a condenser. In the cooling main operation, the outdoor heat exchangers 61 and 71 may serve as a condenser. For example, the first to third indoor heat exchangers 211, 221, and 231 may serve as an evaporator and cool the indoor space, and the fourth indoor heat exchanger 241 may serve as a condenser and heat the indoor space.

More specifically, the first to third high pressure valves 111E, 112E and 113E may be closed, and the first to third low pressure valves 121E, 122E and 123E may be opened. The fourth high pressure valve 114E may be opened, and the fourth low pressure valve 124E may be closed.

In addition, a part or portion of the refrigerant discharged from the compressor 10, 20 may be provided to the high pressure pipe 91, 110 via the second switching valve 52. The refrigerant in the high pressure pipe 110 may flow into the fourth indoor heat exchanger 241 via the fourth high pressure valve 114E, the fourth high pressure pipe 114, and the fourth refrigerant pipe 134, and may be condensed while passing through the fourth indoor heat exchanger 241. Thus, the indoor space in which the fourth indoor heat exchanger 241 is installed may be heated. The fourth indoor expansion valve 243 may control a degree of supercooling of the fourth indoor heat exchanger 241, and the condensed refrigerant may be provided to the liquid pipe 191 through the fourth indoor pipe 242.

In addition, the rest of the refrigerant discharged from the compressor 10, 20 may flow into the outdoor heat exchangers 61, 71 via the discharge pipe 50 and the first switching valve 51 in a first state, and may be condensed while passing through the outdoor heat exchangers 61, 71. The outdoor expansion valve 63, 73 may control a degree of supercooling of the outdoor heat exchanger 61, 71, and the condensed refrigerant may be supplied to the liquid pipe 191 through the liquid pipe 93.

More subsequently, the refrigerant in the liquid pipe 191 may flow through the first to third indoor pipes 212, 222, and 232, and may be expanded by the first to third indoor expansion valves 213, 223, and 233. The expanded refrigerant may be evaporated while passing through the first to third indoor heat exchangers 211, 221, and 231. Accordingly, the indoor space in which the first to third indoor heat exchangers 211, 221, and 231 are installed may be cooled. The first to third indoor expansion valves 213, 223, and 233 may control a degree of superheat of the first to third indoor heat exchangers 211, 221, and 231, and the evaporated refrigerant may flow through the first to third refrigerant pipes 131, 132, and 133 and the first to third low pressure pipes 121, 122, and 123. The refrigerant passed through the first to third low pressure valves 121E, 122E, and 123E may be returned to the compressor 10, 20 through the low pressure pipes 120 and 92 and the accumulator 30 (see FIG. 1). Thus, the cooling main operation cycle may be completed.

The controller C may determine whether the aforementioned cooling main body operation is stable (S11). For example, if frequency fluctuations of the compressor 10, 20, condensing pressure fluctuations, and evaporating pressure fluctuations, and a difference between the condensing pressure and a reference condensing pressure remain below a certain or predetermined level for a certain or predetermined period of time, the controller C may determine that the above-mentioned cooling main operation is stable.

When a system is stable (S11: Yes), the controller C may calculate a target evaporating pressure of each of the first to third indoor heat exchangers 211, 221, and 231 serving as an evaporator based on a reference evaporating pressure (S20). As the refrigerant flowing into the first to third indoor heat exchangers 211, 221, and 231 through the first to third indoor expansion valves 213, 223, and 233 is in a two-phase state, a specific target evaporating pressure may correspond to a specific target evaporation temperature.

For example, the target evaporating pressure of a specific indoor heat exchanger may decrease as a set temperature of a specific indoor space selected by a user decreases. If a user selects a set temperature of 25 to 27° C., it can be estimated that the user wishes that air at 14 to 15° C. is provided to the indoor space, and the target evaporation temperature of specific indoor heat exchanger may be controlled to 12 to 13° C. and the degree of superheat of specific indoor heat exchanger may be controlled to 1~2° C.

For example, the target evaporating pressure of a specific indoor heat exchanger may decrease as a difference between the current temperature and the set temperature with respect to a specific indoor space of interest to a user increases. The target evaporating pressure may be determined in consideration of a difference between the pipe temperature and the set temperature of the specific indoor heat exchanger.

After S20, the controller C may set a target evaporating pressure of the system (S21). At S21, the controller C may set the lowest target evaporating pressure among the target evaporating pressures of the first to third indoor heat exchangers 211, 221, and 231 calculated at S20 as a target evaporating pressure of the system. The target evaporating pressure of the system may be the pressure of the refrigerant suctioned into the compressor 10, 20. The controller C may adjust the pressure of the refrigerant suctioned into the compressor 10, 20 to the target evaporating pressure of the system, by controlling the operating frequency Hz of the compressor 10, 20.

After S21, the controller C adjusts the opening degree of each of the first to third low pressure valves 121E, 122E, and 123E, so that the evaporating pressure of each of the first to third indoor heat exchangers 211, 221, and 231 may be adjusted to a target evaporating pressure of each of the first to third indoor heat exchangers 211, 221, and 231 (S22). This may be expressed as in Equation 1 below.

$$L1=f(P1), L2=f(P2), L3=f(P3) \quad \text{Equation 1:}$$

Here, L1 is the opening degree of the first low pressure valve 121E, P1 is the evaporating pressure of the first indoor heat exchanger 211, and the evaporating pressure may be measured by a pressure sensor at the inlet side of the first indoor heat exchanger 211. L2 is the opening degree of the second low pressure valve 122E, P2 is the evaporating pressure of the second indoor heat exchanger 221, and the evaporating pressure may be measured by a pressure sensor at the inlet side of the second indoor heat exchanger 221. L3 is the opening degree of the third low pressure valve 123E, P3 is the evaporating pressure of the third indoor heat exchanger 231, and the evaporating pressure may be measured by a pressure sensor at the inlet side of the third indoor heat exchanger 231.

In this case, if a pressure drop of the refrigerant in the refrigerant pipe connecting the indoor heat exchanger and the compressor is excluded from being considered, the evaporating pressure of the indoor heat exchanger 211, 221, 231 connected to the fully opened low pressure valve 121E, 122E, 123E may be the same as the target evaporating pressure of the system, that is, the pressure of the refrigerant at the inlet side of the compressor 10, 20. In addition, as the opening degree of the low pressure valve 121E, 122E, 123E decreases, the evaporating pressure of the indoor heat exchanger 211, 221, 231 connected thereto may be greater than the target evaporating pressure of the system, that is, the pressure (fixed value) of the refrigerant at the inlet side of the compressor 10, 20.

Accordingly, the controller C controls the opening degree of each of the first to third low pressure valves 121E, 122E, and 123E, so that the evaporating pressure of each of the first to third indoor heat exchangers 211, 221, and 231 may be adjusted to a target evaporating pressure of each of the first to third indoor heat exchangers 211, 221, and 231 (S22). As a result, the temperature (blowdown temperature) of the air that has passed through each of the first to third indoor heat exchangers 211, 221, and 231 and is supplied to the cooling space may be adjusted for each indoor exchanger.

For example, the target evaporating pressure of the first indoor heat exchanger 211 may be 860 kPa, the target evaporating pressure of the second indoor heat exchanger 221 may be 852 kPa, and the target evaporating pressure of the third indoor heat exchanger 231 may be 901 kPa. The target evaporating pressure of the system is 852 kPa, which is the target evaporating pressure of the second indoor heat exchanger 221, and the second low pressure valve 122E is fully opened. The first low pressure valve 121E may be slightly closed to form a differential pressure so that the first indoor heat exchanger 211 has an evaporating pressure of 860 kPa. The third low pressure valve 123E may be slightly closed to form a differential pressure so that the third indoor heat exchanger 231 has an evaporating pressure of 901 kPa. The opening degree of the third low pressure valve 123E may be smaller than the opening degree of the first low pressure valve 121E. In this case, based on a case in which the indoor heat exchangers have the same degree of superheat, the blowdown temperature may be high in the order of the third indoor heat exchanger 231, the first indoor heat exchanger 211, and the second indoor heat exchanger 221.

After S22, the controller C may determine whether a preparation for switching the state of the first switching valve 51 from a first state to a second state is necessary (S30). At S30, when the target evaporating pressure of the system and the rate of change of the target evaporating pressure of the system exceed a certain or predetermined level and are maintained for a certain or predetermined time, the controller C may estimate that the cooling load has sufficiently decreased, and may determine that a preparation for switching is necessary. In addition, at S30, if a time period of thermo-off (a control for stopping the operation of the indoor heat exchanger when the indoor temperature is lowered to a set temperature or less) of the first to third indoor heat exchangers 211, 221, and 231 exceeds a reference time, the controller C may estimate that the cooling load has sufficiently decreased, and may determine that a preparation for switching is necessary.

For example, during the cooling main operation, when the lowest target evaporating pressure among the target evaporating pressures of the indoor heat exchangers increases as the cooling load decreases, correspondingly, the target evaporating pressure of the system (see the two-dot chain line in FIG. 6) may be increased from the first evaporating pressure EP1 to the second evaporating pressure EP2 (see u1) by adjusting the operating frequency of the compressor 10, 20. In addition, the controller C may adjust the operating frequency of the compressor 10, 20 to increase the target evaporating pressure of the system (see the dotted-dot chain line in FIG. 6) from a second evaporating pressure EP2 to a third evaporating pressure EP3 (see u2). When the third evaporating pressure (EP3) exceeding a certain or predetermined level and the change rate of the target evaporating pressure of the system are maintained for a certain or predetermined time, the controller C may estimate that the cooling load has sufficiently decreased, and determine that a preparation for switching is necessary. When it is determined that the preparation for switching is unnecessary (S30: No), the controller C may return to S20.

If it is determined that switching preparation is necessary (S30: Yes), the controller C may enter a preparation operation for switching the state of the first switching valve 51 from the first state to the second state (S31). At S31, the controller C may set the pressure of the two-phase refrigerant having a temperature slightly lower than the current room temperature as the target evaporating pressure of the system. In addition, the controller C may adjust the operating frequency of the compressor 10, 20 to increase the target evaporating pressure of the system (see the two-dot chain line in FIG. 6) from the third evaporating pressure EP3 to a fourth evaporating pressure EP4 (see u3). That is, the switching preparation operation of S31 may be a weak cooling operation.

After S31, the controller C may determine whether the switching preparation operation of S31 is maintained (S32). At S32, if a difference between the current room temperature and the set temperature is less than a certain or predetermined value, the controller C may determine that the switching preparation operation of S31 is maintained. That is, if the cooling load is maintained in a sufficiently small state despite the weak cooling operation, the controller C may determine that the switching preparation operation is maintained. If it is determined that the switching preparation operation is not maintained (S32: No), the controller C may return to S20.

If it is determined that the switching preparation operation is maintained (S32: Yes), the controller C may determine whether the switching preparation operation of S31 is completed (S33). At S33, the controller C may determine that the switching preparation operation is completed, when the difference between the condensing pressure of the system and the target evaporating pressure of the system is less than a certain or predetermined level, or the switching preparation operation time of S31 exceeds a reference time. If it is determined that the switching preparation operation is not completed (S33: No), the controller C may return to S31.

When it is determined that the switching preparation operation is completed (S33: Yes), the controller C may switch the first switching valve 51 from the first state (see FIG. 7) to the second state (see FIG. 8)(see switch point in FIG. 6). As the switching of the first switching valve 51 proceeds when the difference between the condensing pressure of the system and the evaporating pressure of the system is considerably low (see delta P2 in FIG. 6), the noise generated when the first switching valve 51 is switched may be minimized. In comparison, a conventional air conditioner in which the evaporating pressure of the system is fixed regardless of the cooling load has a problem in that a large noise is generated by switching the first switching valve when the difference between the condensing pressure of the system and the evaporating pressure of the system is very large (see delta P1 in FIG. 6).

Figure 8:
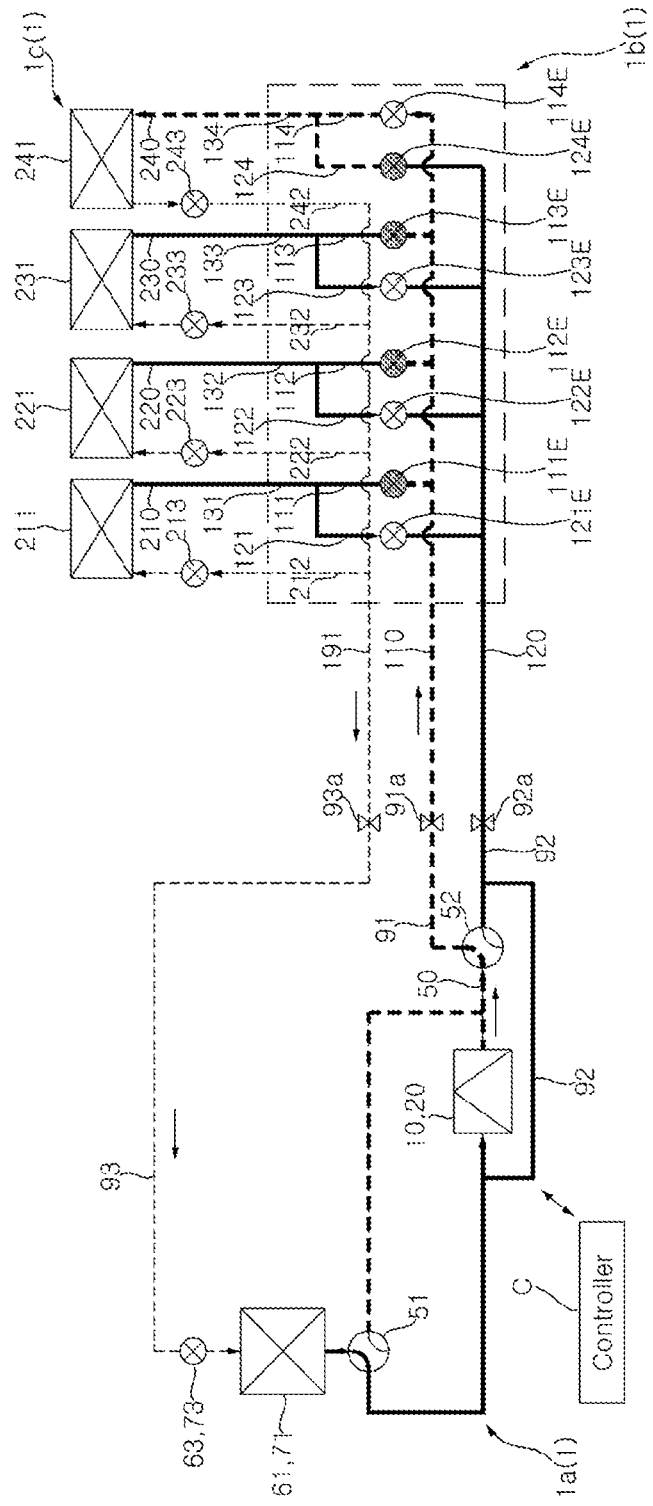
Figure 9:
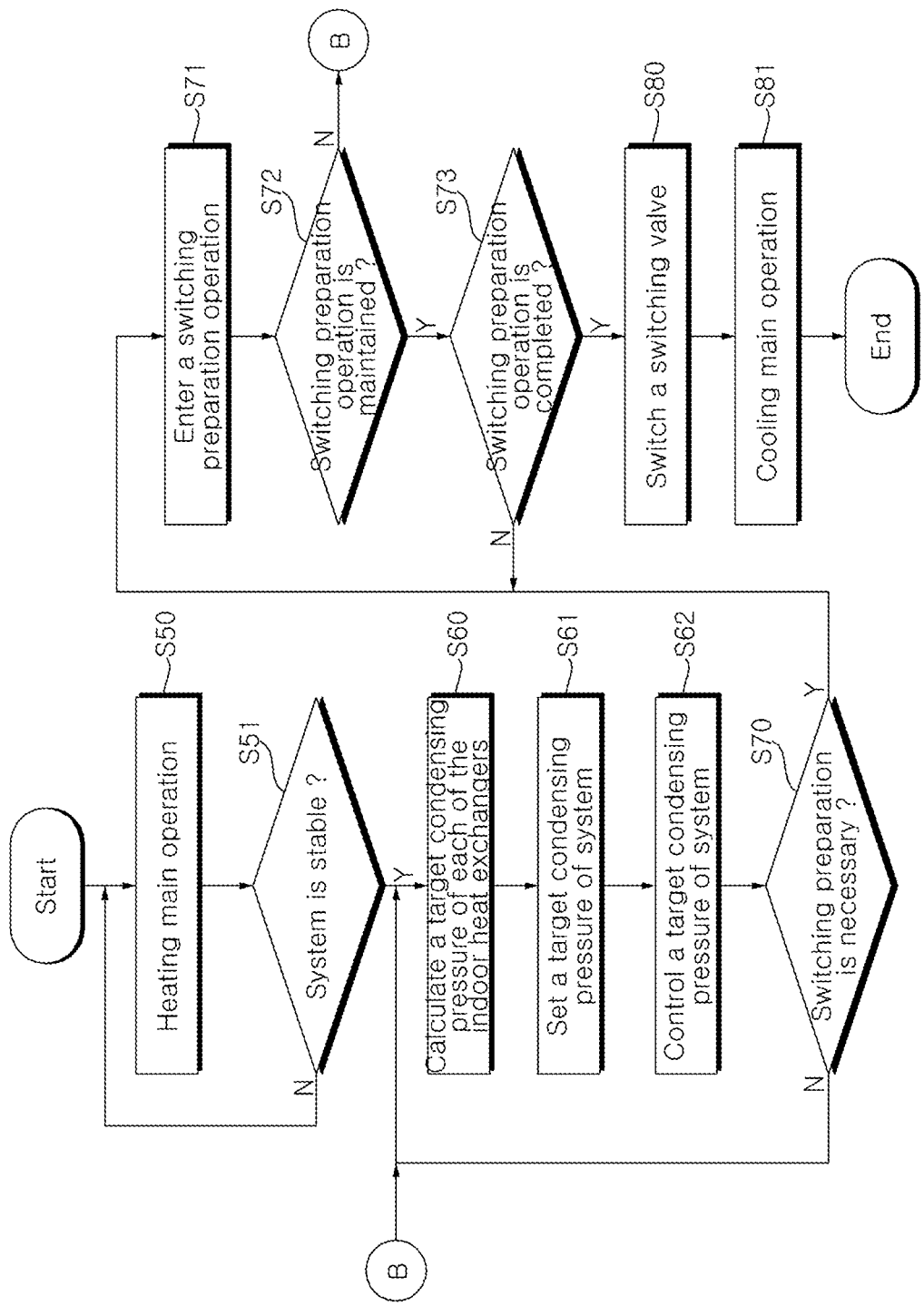
FIGS. 9 to 12 are a flow chart, graph, and schematic diagrams for explaining a method of switching from a heating main operation to a cooling main operation.
Figure 10:
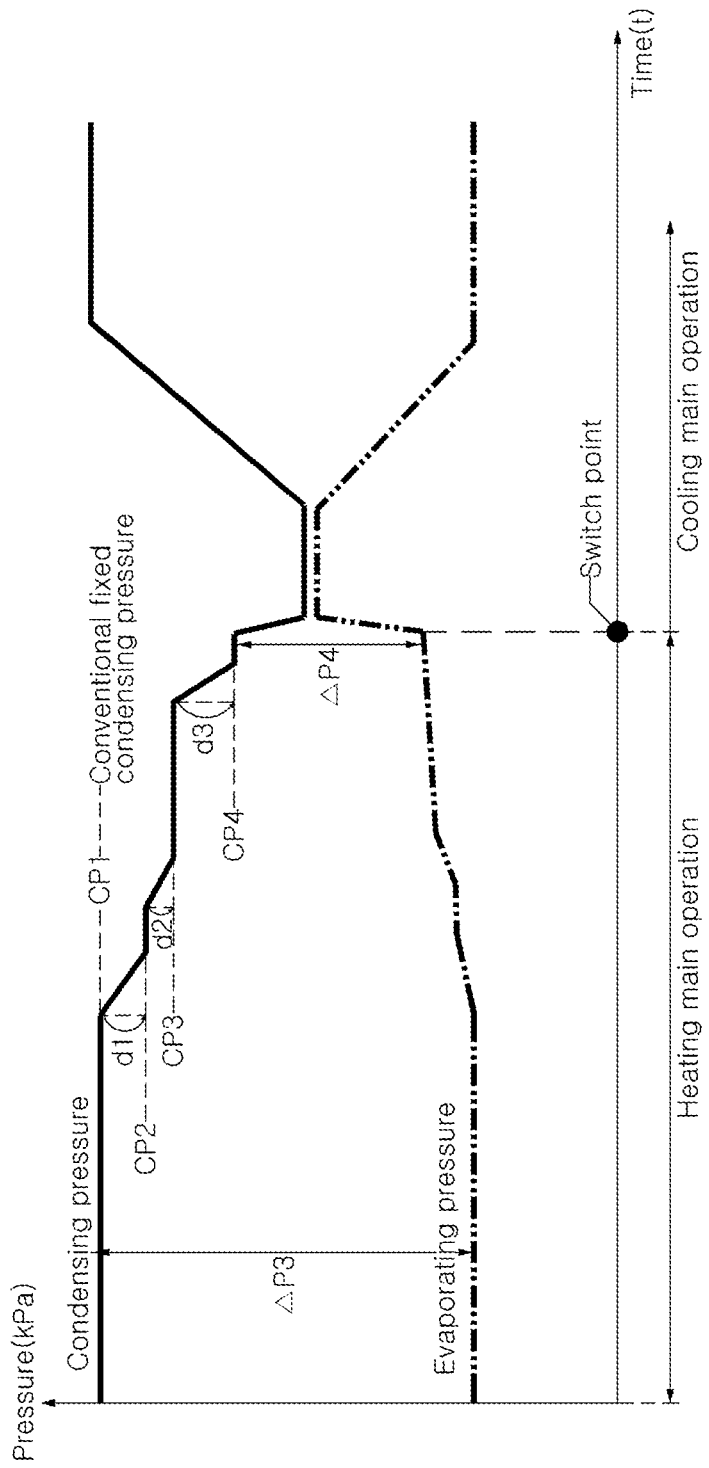

After S40, the controller C may perform the heating main operation of the air conditioner (S41, see FIG. 8). The heating main operation is an operation performed when the heating load of the indoor heat exchanger serving as a condenser among the plurality of indoor heat exchangers 211, 221, 231, and 241 is greater than the cooling load of the indoor heat exchanger serving as an evaporator. In the heating main operation, the outdoor heat exchanger 61, 71 may serve as an evaporator. For example, the first to third indoor heat exchangers 211, 221, and 231 (but, their total cooling load may be considerably low) may serve as an evaporator and cool the indoor space, and the fourth indoor heat exchanger 241 may serve as a condenser and may heat the indoor space.

More specifically, the first to third high pressure valves 111E, 112E and 113E may be closed, and the first to third low pressure valves 121E, 122E and 123E may be opened. The fourth high pressure valve 114E may be opened, and the fourth low pressure valve 124E may be closed.

In addition, the refrigerant discharged from the compressor 10, 20 may be provided to the high pressure pipe 91, 110 via the second switching valve 52. The refrigerant in the high pressure pipe 110 may flow into the fourth indoor heat exchanger 241 via the fourth high pressure valve 114E, the fourth high pressure pipe 114, and the fourth refrigerant pipe 134, and may be condensed while passing through the fourth indoor heat exchanger 241. Thus, the indoor space in which the fourth indoor heat exchanger 241 is installed may be heated. The fourth indoor expansion valve 243 may control the degree of supercooling of the fourth indoor heat exchanger 241, and the condensed refrigerant may be provided to the liquid pipe 191 through the fourth indoor pipe 242.

More subsequently, the refrigerant in the liquid pipe 191 may flow through the first to third indoor pipes 212, 222, and 232 and the liquid pipe 93, and may be expanded by the first to third indoor expansion valves 213, 223, and 233 and the outdoor expansion valve 63, 73. The expanded refrigerant may be evaporated while passing through the first to third indoor heat exchangers 211, 221, and 231 and the outdoor heat exchanger 61, 71. Thus, the indoor space in which the first to third indoor heat exchangers 211, 221, and 231 are installed may be slightly cooled (or, the operation of at least one of the first to third indoor heat exchangers 211, 221, and 231 may be stopped, and a low pressure valve connected to the stopped indoor heat exchanger may be closed).

The refrigerant evaporated while passing through the first to third indoor heat exchangers 211, 221, and 231 may flow through the first to third refrigerant pipes 131, 132, and 133 and the first to third low pressure pipes 121, 122, and 123. The refrigerant passed through the first to third low pressure valves 121E, 122E, and 123E may be returned to the compressor 10, 20 via the low pressure pipes 120 and 92 and the accumulator 30 (see FIG. 1). The refrigerant evaporated while passing through the outdoor heat exchanger 61, 71 may be returned to the compressor 10, 20 via the first switching valve 51 in the second state and the accumulator 30 (see FIG. 1). Thus, the heating main operation cycle may be completed.

Figure 11:
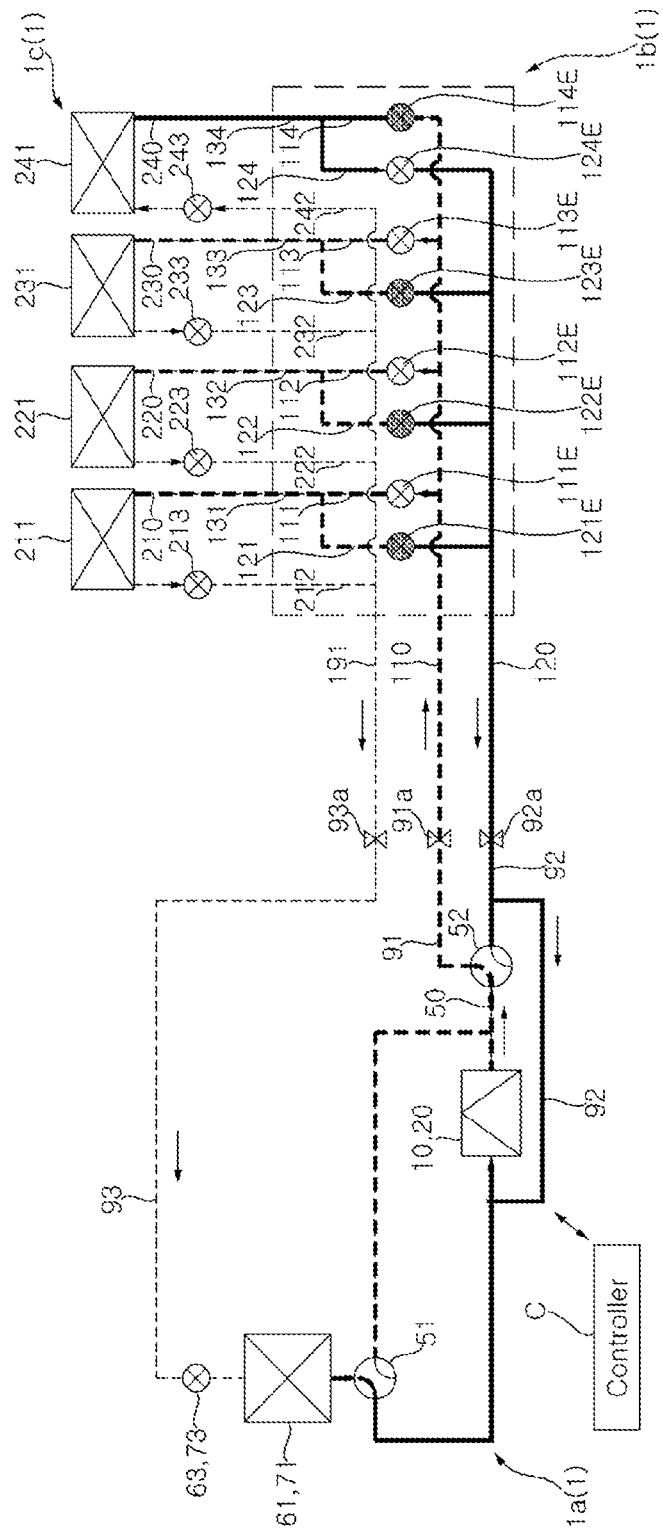

Referring to FIGS. 9 to 12, the controller C of the air conditioner may perform a heating main operation of the air conditioner (S50, see FIG. 11).

The heating main operation is an operation performed when the heating load of the indoor heat exchanger serving as a condenser among the plurality of indoor heat exchangers 211, 221, 231, and 241 is greater than the cooling load of the indoor heat exchanger serving as an evaporator. In the heating main operation, the outdoor heat exchanger 61, 71 may serve as an evaporator. For example, the first to third indoor heat exchangers 211, 221, and 231 may serve as a condenser and may heat the indoor space, and the fourth indoor heat exchanger 241 may serve as an evaporator and may cool the indoor space.

More specifically, the first to third high pressure valves 111E, 112E and 113E may be opened, and the first to third low pressure valves 121E, 122E and 123E may be closed. The fourth high pressure valve 114E may be closed, and the fourth low pressure valve 124E may be opened. In addition, the refrigerant discharged from the compressor 10, 20 may be provided to the high pressure pipe 91, 110 via the second switching valve 52. The refrigerant in the high pressure pipe 110 may flow into the first to third indoor heat exchangers 211, 221, and 231 via the first to third high pressure valves 111E, 112E, and 113E, the first to third high pressure pipes 111, 112, and 113, and the first to third refrigerant pipes 131, 132, and 133, and may be condensed while passing through the first to third indoor heat exchangers 211, 221, and 231. Thus, the indoor space in which the first to third indoor heat exchangers 211, 221, and 231 are installed may be heated. The fourth indoor expansion valve 243 may control the degree of supercooling of the fourth indoor heat exchanger 241, and the condensed refrigerant may be provided to the liquid pipe 191 through the fourth indoor pipe 242. The first to third indoor expansion valves 213, 223, and 233 may control the degree of supercooling of the first to third indoor heat exchangers 211, 221, and 231, and the condensed refrigerant may be provided to the liquid pipe 191 through the first to third indoor pipes 212, 222, and 232.

Subsequently, the refrigerant in the liquid pipe 191 may flow through the fourth indoor pipe 242 and the liquid pipe 93, and may be expanded by the fourth indoor expansion valve 243 and the outdoor expansion valve 63, 73. The expanded refrigerant may be evaporated while passing through the fourth indoor heat exchanger 241 and the outdoor heat exchanger 61, 71. Thus, the indoor space in which the fourth indoor heat exchanger 241 is installed may be cooled.

The refrigerant evaporated while passing through the fourth indoor heat exchanger 241 may flow through the fourth refrigerant pipe 134 and the fourth low pressure pipe 124. The refrigerant passed through the fourth low pressure valve 124E may be returned to the compressor 10, 20 via the low pressure pipes 120 and 90 and the accumulator 30 (see FIG. 1).

The refrigerant evaporated while passing through the outdoor heat exchanger 61, 71 may be returned to the compressor 10, 20 via the first switching valve 51 in the second state and the accumulator (30, see FIG. 1). Thus, the heating main operation cycle may be completed.

The controller C may determine whether the above-mentioned heating main body operation is stable (S51). For example, if frequency fluctuations of the compressor 10, 20, condensing pressure fluctuations, and evaporating pressure fluctuations, and the difference between the condensing pressure and the reference condensing pressure remain less than a certain or predetermined level for a certain or predetermined period of time, the controller C may determine that the above-mentioned heating main body operation is stable.

When the system is stable (S51: Yes), the controller C may calculate the target condensing pressure of each of the first to third indoor heat exchangers 211, 221, and 231 serving as a condenser based on a reference condensing pressure (S60). For example, as the set temperature of a specific indoor space selected by a user increases, the target condensing pressure of a specific indoor heat exchanger may increase.

For example, the target condensing pressure of a specific indoor heat exchanger may increase as the difference between the set temperature and the current temperature with respect to a specific indoor space of interest to a user increases. The target condensing pressure may be determined in consideration of the difference between the pipe temperature of a specific indoor heat exchanger and the set temperature.

After S60, the controller C may set the target condensing pressure of the system (S61). At S61, the controller C may set the highest target condensing pressure among the target condensing pressures of the first to third indoor heat exchangers 211, 221, and 231 calculated in S60 as a target condensing pressure of the system. The target condensing pressure of the system may be the pressure of the refrigerant discharged from the compressor 10, 20.

After S61, the controller C adjusts the pressure of the refrigerant discharged from the compressor 10, 20 to the target condensing pressure of the system by adjusting the operating frequency Hz of the compressor 10, 20 (S62). For example, the target condensing pressure of the first indoor heat exchanger 211 may be 2850 kPa, the target condensing pressure of the second indoor heat exchanger 221 may be 2831 kPa, and the target condensing pressure of the third indoor heat exchanger 231 may be 2790 kPa. The target condensing pressure of the system is 2850 kPa, which is the target condensing pressure of the first indoor heat exchanger 211, and the first to third high pressure valves 111E, 112E, and 113E may be completely opened. That is, the operating condensing pressure of the first to third indoor heat exchangers 211, 221, and 231 may be the same as the target condensing pressure of the system.

After S62, the controller C may determine whether a preparation for switching the state of the first switching valve 51 from a second state to a first state is necessary (S70). At S70, when the target condensing pressure of the system is less than a certain or predetermined level and the rate of change of the target condensing pressure of the system exceeds a certain or predetermined level and is maintained for a certain or predetermined time, the controller C may estimate that the heating load has sufficiently decreased, and may determine that a preparation for switching is necessary. In addition, at S70, if a time period of thermo-off (a control for stopping the operation of the indoor heat exchanger when the indoor temperature becomes higher than a set temperature) of the first to third indoor heat exchangers 211, 221, and 231 exceeds a reference time, the controller C may estimate that the heating load has sufficiently decreased, and may determine that a preparation for switching is necessary.

For example, during the heating main operation, when the highest target condensing pressure among the target evaporating pressures of indoor heat exchangers decreases as the heating load decreases, correspondingly, the target condensing pressure of the system (see the solid line in FIG. 10) may be decreased from the first condensing pressure CP1 to the second condensing pressure CP2 (see d1) by adjusting the operating frequency of the compressor 10, 20. In addition, the controller C may adjust the operating frequency of the compressor 10, 20 to decrease the target condensing pressure of the system (see the solid line in FIG. 6) from the second condensing pressure CP2 to a third condensing pressure CP3 (see d2). When the third condensing pressure CP3 drops below a certain or predetermined level and the change rate of the target condensing pressure of the system are maintained for a certain or predetermined time, the controller C may estimate that the heating load has sufficiently decreased, and determine that a preparation for switching is necessary. When it is determined that the preparation for switching is unnecessary (S70: No), the controller C may return to S60.

If it is determined that preparation for switching is necessary (S70: Yes), the controller C may enter a preparation operation for switching the state of the first switching valve 51 from the second state to the first state (S71). At S71, the controller C may set the pressure of the refrigerant having a temperature slightly higher than the current room temperature as a target condensing pressure of the system. In addition, the controller C may adjust the operating frequency of the compressor 10, 20 to lower the target condensing pressure of the system (see the solid line in FIG. 6) from the third condensing pressure CP3 to a fourth condensing pressure CP4 (see d3). That is, the switching preparation operation of S71 may be a weak heating operation.

After S71, the controller C may determine whether the switching preparation operation of S71 is maintained (S72). At S72, the controller C may determine that the switching preparation operation of S71 is maintained when the difference between the current room temperature and the set temperature exceeds a certain value. That is, if the heating load is maintained at a sufficiently small state despite the weak heating operation, the controller C may determine that the switching preparation operation is maintained. If it is determined that the switching preparation operation is not maintained (S72: No), the controller C may return to S60.

If it is determined that the switching preparation operation is maintained (S72: Yes), the controller C may determine whether the switching preparation operation of S71 is completed (S73). At S73, the controller C may determine that the switching preparation operation is completed, when the difference between the target condensing pressure of the system and the evaporating pressure of the system is less than a certain or predetermined level, or the switching preparation operation time of S71 exceeds a reference time. If it is determined that the switching preparation operation is not completed (S73: No), the controller C may return to S71.

When it is determined that the switching preparation operation is completed (S73: Yes), the controller C may switch the first switching valve 51 from the second state (see FIG. 11) to the first state (see FIG. 12) (see switch point in FIG. 10). As the switching of the first switching valve 51 proceeds when the difference between the condensing pressure of the system and the evaporating pressure of the system is considerably low (see delta P4 in FIG. 10), the noise generated when the first switching valve 51 is switched may be minimized. In comparison, a conventional air conditioner in which the condensing pressure of the system is fixed regardless of the heating load has a problem in that a large noise is generated by switching the first switching valve when the difference between the condensing pressure of the system and the evaporating pressure of the system is very large (see delta P3 in FIG. 10).

Figure 12:
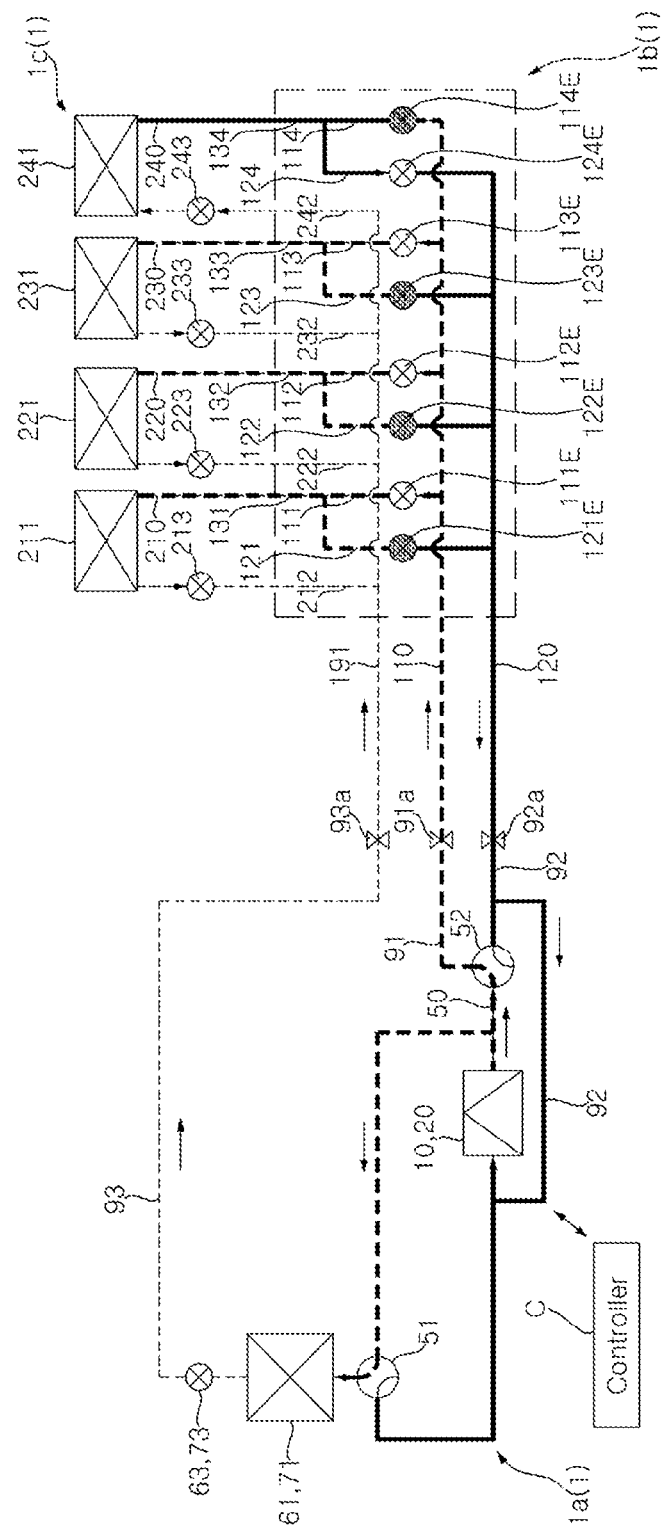

After S80, the controller C may perform the cooling main operation of the air conditioner (S81, see FIG. 12). The cooling main operation is an operation performed when the cooling load of the indoor heat exchanger serving as an evaporator among the plurality of indoor heat exchangers 211, 221, 231, and 241 is greater than the heating load of the indoor heat exchanger serving as a condenser. In the cooling main operation, the outdoor heat exchanger 61, 71 may serve as a condenser. For example, the first to third indoor heat exchangers 211, 221, and 231 (but, their total heating load may be considerably low) may serve as a condenser and heat the indoor space, and the fourth indoor heat exchanger 241 may serve as an evaporator and may cool the indoor space.

More specifically, the first to third high pressure valves 111E, 112E, and 113E may be opened, and the first to third low pressure valves 121E, 122E, and 123E may be closed. The fourth high pressure valve 114E may be closed, and the fourth low pressure valve 124E may be opened.

In addition, a part or portion of the refrigerant discharged from the compressor 10, 20 may be provided to the high pressure pipe 91, 110 via the second switching valve 52. The refrigerant in the high pressure pipe 110 may flow into the first to third indoor heat exchangers 211, 221, and 231 via the first to third high pressure valves 111E, 112E, and 113E, the first to third high pressure pipes 111, 112, and 113, and the first to third refrigerant pipes 131, 132, and 133, and may be condensed while passing through the first to third indoor heat exchangers 211, 221, and 231. Thus, the indoor space in which the first to third indoor heat exchangers 211, 221, and 231 are installed may be slightly heated (or, at least one of the first to third indoor heat exchangers 211, 221, and 231 may stop operating, and the high pressure valve connected to the stopped indoor heat exchanger may be closed). The first to third indoor expansion valves 213, 223, and 233 may control the degree of supercooling of the first to third indoor heat exchangers 211, 221, and 231, and the condensed refrigerant may be provided to the liquid pipe 191 through the first to third indoor pipes 212, 222, and 232.

In addition, the rest of the refrigerant discharged from the compressor 10, 20 may flow into the outdoor heat exchanger 61, 71 via the discharge pipe 50 and the first switching valve 51 of the first state, and may be condensed while passing through the outdoor heat exchanger 61, 71. The outdoor expansion valve 63, 73 may control the degree of supercooling of the outdoor heat exchanger 61, 71, and the condensed refrigerant may be supplied to the liquid pipe 191 through the liquid pipe 93.

Subsequently, the refrigerant of the liquid pipe 191 may flow through the fourth indoor pipe 242 and the liquid pipe 93, and may be expanded by the fourth indoor expansion valve 243 and the outdoor expansion valve 63, 73. The expanded refrigerant may be evaporated while passing through the fourth indoor heat exchanger 241 and the outdoor heat exchanger 61, 71. Thus, the indoor space in which the fourth indoor heat exchanger 241 is installed may be cooled.

The refrigerant evaporated while passing through the fourth indoor heat exchanger 241 may flow through the fourth refrigerant pipe 134 and the fourth low pressure pipe 124. The refrigerant passed through the fourth low pressure valve 124E may be returned to the compressor 10, 20 via the low pressure pipes 120 and 90 and the accumulator 30 (see FIG. 1). Thus, the cooling main operation cycle may be completed.

Advantages of an air conditioner according to embodiments disclosed herein include the following.

According to at least one of embodiments disclosed herein, an air conditioner capable of minimizing noise that is generated when an operation mode of the air conditioner is switched may be provided.

According to at least one of embodiments disclosed herein, an air conditioner capable of minimizing noise of a switching valve that is generated when switching from a cooling main operation to a heating main operation or from the heating main operation to the cooling main operation may be provided.

According to at least one of embodiments disclosed herein, it is possible to provide an air conditioner capable of reducing a frequency of thermo-off of an indoor heat exchanger, by actively controlling evaporating pressure or condensing pressure in response to a cooling load or heating load.

According to at least one of embodiments disclosed herein, it is possible to provide a method of calculating a target evaporating pressure or a target condensing pressure of each indoor heat exchanger in response to a cooling load or heating load of each indoor heat exchanger, and a method of setting the evaporating pressure or condensing pressure of a system.

According to at least one of embodiments disclosed herein, a method of adjusting the evaporating pressure of each indoor heat exchanger to a target evaporating pressure may be provided.

According to at least one of embodiments disclosed herein, it is possible to provide a method for determining whether a preparation operation for switching from cooling main operation to heating main operation or switching from heating main operation to cooling main operation has entered, maintained, and completed.

Embodiments disclosed herein solve at least the above and other problems.

Embodiments disclosed herein provide an air conditioner capable of minimizing noise that is generated when an operation mode of the air conditioner is switched.

Embodiments disclosed herein provide an air conditioner capable of minimizing noise of a switching valve that is generated when switching from a cooling main operation to a heating main operation or from a heating main operation to a cooling main operation.

Embodiments disclosed herein provide an air conditioner capable of reducing a frequency of thermo-off of an indoor heat exchanger, by actively controlling evaporating pressure or condensing pressure in response to a cooling load or heating load.

Embodiments disclosed herein provide a method of calculating a target evaporating pressure or a target condensing pressure of each indoor heat exchanger in response to a cooling load or heating load of each indoor heat exchanger, and a method of setting the evaporating pressure or condensing pressure of a system.

Embodiments disclosed herein provide a method of adjusting the evaporating pressure of each indoor heat exchanger to a target evaporating pressure.

Embodiments disclosed herein provide a method for determining whether a preparation operation for switching from a cooling main operation to a heating main operation or switching from the heating main operation to the cooling main operation has entered, maintained, and completed.

Embodiments disclosed herein provide an air conditioner that may include a controller; a compressor; an outdoor heat exchanger; indoor heat exchangers; a switching valve that selectively guides a refrigerant discharged from the compressor to the outdoor heat exchanger or the indoor heat exchangers; high pressure pipes which connect the switching valve and the indoor heat exchangers, the high pressure pipes in which high pressure valves are installed; low pressure pipes which connect an inlet of the compressor and the high pressure pipes, the low pressure pipes in which low pressure valves are installed; indoor pipes which are opposite to the high pressure pipes with respect to the indoor heat exchangers and connected to the indoor heat exchangers, the indoor pipes in which indoor expansion valves are installed; and a liquid pipe which connects the outdoor heat exchanger and the indoor pipes, the liquid pipe in which an outdoor expansion valve is installed. The outdoor heat exchanger may serve as a condenser when the switching valve is in a first state, and may serve as an evaporator when the switching valve is in a second state.

The controller may increase a system evaporating pressure which is a pressure of refrigerant suctioned into the compressor before switching the switching valve from the first state to the second state. The controller may decrease a system condensing pressure which is a pressure of refrigerant discharged from the compressor before switching the switching valve from the second state to the first state.

A cooling load of indoor heat exchangers that serve as an evaporator among the indoor heat exchangers may be greater than a heating load of an indoor heat exchanger that serves as a condenser among the indoor heat exchangers, and the controller may control the switching valve as the first state.

An opening degree of each of the low pressure valves may be adjustable, and a target of the system evaporating pressure may be set to a lowest target evaporating pressure among target evaporating pressures of the indoor heat exchangers serving as the evaporator. A target evaporating pressure of each of the indoor heat exchangers serving as the evaporator may be calculated based on a temperature of an indoor space in which the indoor heat exchanger is installed, a user's set temperature for the indoor space, and pipe temperature information of the indoor heat exchanger.

The low pressure valve may be an electronic expansion valve EEV. The controller may control an opening degree of each of the low pressure valves so as to adjust an evaporating pressure of each of the indoor heat exchangers serving as the evaporator to the target evaporating pressure. The evaporating pressure of each of the indoor heat exchangers serving as the evaporator may be increased as the opening degree of each of the low pressure valves is decreased.

When it is determined that the cooling load is reduced below a certain or predetermined level, the controller may set a pressure corresponding to a temperature that is lower than a current room temperature by a certain or predetermined temperature as the target of the system evaporating pressure, and may perform a switching preparation operation of adjusting an operating frequency of the compressor. The controller may continue the switching preparation operation, when a difference between a current room temperature and a set temperature is less than a certain or predetermined level. When a difference between the system condensing pressure and the system evaporating pressure is less than a certain or predetermined level, or when a time for the switching preparation operation exceeds a reference time, the controller may switch the switching valve from the first state to the second state.

A heating load of indoor heat exchangers serving as a condenser among the indoor heat exchangers may be greater than a cooling load of an indoor heat exchanger serving as an evaporator among the indoor heat exchangers, the controller may control the switching valve as the second state. A target of the system condensing pressure may be set to a highest target condensing pressure among target condensing pressures of the indoor heat exchangers serving as the condenser. A target condensing pressure of each of the indoor heat exchangers serving as the condenser may be calculated based on a temperature of an indoor space in which the indoor heat exchanger is installed, a user's set temperature for the indoor space, and pipe temperature information of the indoor heat exchanger.

When it is determined that the heating load is reduced below a certain or predetermined level, the controller may set a pressure corresponding to a temperature that is higher than a current room temperature by a certain or predetermined temperature as the target of the system condensing pressure, and may perform a switching preparation operation of adjusting an operating frequency of the compressor.

The controller may continue the switching preparation operation when a difference between a current room temperature and a set temperature exceeds a certain or predetermined level, and may switch the switching valve from the second state to the first state, when a difference between the system condensing pressure and the system evaporating pressure is less than a certain or predetermined level, or when a time for the switching preparation operation exceeds a reference time.

Certain embodiments or other embodiments described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
a controller;
a compressor;
an outdoor heat exchanger;
a plurality of indoor heat exchangers;
a switching valve that selectively guides a refrigerant discharged from the compressor to the outdoor heat exchanger or the plurality of indoor heat exchangers;
high pressure pipes that connect the switching valve and the plurality of indoor heat exchangers;
high pressure valves installed in the high pressure pipes;
low pressure pipes that connect an inlet of the compressor and the high pressure pipes;
low pressure valves installed in the low pressure pipes;
indoor pipes, which are opposite to the high pressure pipes with respect to the plurality of indoor heat exchangers and connected to the plurality of indoor heat exchangers;
indoor expansion valves installed in the indoor pipes; and
a liquid pipe that connects the outdoor heat exchanger and the plurality of indoor pipes; and
an outdoor expansion valve installed in the liquid pipe, wherein the outdoor heat exchanger serves as a condenser when the switching valve is in a first state, and serves as an evaporator when the switching valve is in a second state, wherein the controller increases a system evaporating pressure, which is a pressure of refrigerant suctioned into the compressor, before switching the switching valve from the first state to the second state, and decreases a system condensing pressure, which is a pressure of refrigerant discharged from the compressor, before switching the switching valve from the second state to the first state.

2. The air conditioner of claim 1, wherein when a cooling load of indoor heat exchangers of the plurality of indoor heat exchangers that serve as an evaporator is greater than a heating load of an indoor heat exchanger of the plurality of indoor heat exchangers that serves as a condenser, the controller is configured to control the switching valve to switch to the first state.

3. The air conditioner of claim 2, wherein an opening degree of each of the low pressure valves is adjustable, and wherein a target of the system evaporating pressure is set to a lowest target evaporating pressure among target evaporating pressures of the indoor heat exchangers serving as the evaporator.

4. The air conditioner of claim 3, wherein the target evaporating pressure of each of the indoor heat exchangers serving as the evaporator is calculated based on a temperature of an indoor space in which the respective indoor heat exchanger is installed, a user's set temperature for the indoor space, and pipe temperature information of the respective indoor heat exchanger.

5. The air conditioner of claim 3, wherein the low pressure valves are electronic expansion valves.

6. The air conditioner of claim 3, wherein the controller is configured to control the opening degree of each of the low pressure valves so as to adjust an evaporating pressure of each of the indoor heat exchangers serving as the evaporator to the target evaporating pressure.

7. The air conditioner of claim 6, wherein the evaporating pressure of each of the indoor heat exchangers serving as the evaporator is increased as the opening degree of each of the low pressure valves is decreased.

8. The air conditioner of claim 3, wherein when it is determined that the cooling load is reduced below a predetermined level, the controller sets a pressure corresponding to a temperature that is lower than a current room temperature by a predetermined temperature as the target of the system evaporating pressure, and performs a switching preparation operation of adjusting an operating frequency of the compressor.

9. The air conditioner of claim 8, wherein when a difference between a current room temperature and a set temperature is less than a predetermined level, the controller is configured to continue the switching preparation operation.

10. The air conditioner of claim 9, wherein when a difference between the system condensing pressure and the system evaporating pressure is less than a predetermined level, or when a time for the switching preparation operation exceeds a reference time, the controller is configured to switch the switching valve from the first state to the second state.

11. The air conditioner of claim 1, wherein when a heating load of indoor heat exchangers of the plurality of indoor heat exchangers serving as a condenser is greater than a cooling load of an indoor heat exchanger of the plurality of indoor heat exchangers serving as an evaporator, the controller is configured to control the switching valve to switch to the second state.

12. The air conditioner of claim 11, wherein an opening degree of each of the high pressure valves is adjustable, and wherein a target of the system condensing pressure is set to a highest target condensing pressure among target condensing pressures of the indoor heat exchangers serving as the condenser.

13. The air conditioner of claim 12, wherein the target condensing pressure of each of the indoor heat exchangers serving as the condenser is calculated based on a temperature of an indoor space in which the respective indoor heat exchanger is installed, a user's set temperature for the indoor space, and pipe temperature information of the respective indoor heat exchanger.

14. The air conditioner of claim 12, wherein when it is determined that the heating load is reduced below a predetermined level, the controller is configured to set a pressure corresponding to a temperature that is higher than a current room temperature by a predetermined temperature as the target of the system condensing pressure, and perform a switching preparation operation of adjusting an operating frequency of the compressor.

15. The air conditioner of claim 14, wherein the controller is configured to continue the switching preparation operation when a difference between a current room temperature and a set temperature exceeds a predetermined level, and switch the switching valve from the second state to the first state, when a difference between the system condensing pressure and the system evaporating pressure is less than a predetermined level, or when a time for the switching preparation operation exceeds a reference time.

16. An air conditioner, comprising:
a controller;
a compressor;
an outdoor heat exchanger;
a plurality of indoor heat exchangers;
a switching valve that selectively guides a refrigerant discharged from the compressor to the outdoor heat exchanger or the plurality of indoor heat exchangers;
high pressure pipes that connect the switching valve and the plurality of indoor heat exchangers;
high pressure valves installed in the high pressure pipes;
low pressure pipes that connect an inlet of the compressor and the high pressure pipes;
low pressure valves installed in the low pressure pipes;
indoor pipes, which are opposite to the high pressure pipes with respect to the plurality of indoor heat exchangers and connected to the plurality of indoor heat exchangers;
indoor expansion valves installed in the indoor pipes; and
a liquid pipe that connects the outdoor heat exchanger and the plurality of indoor pipes; and
an outdoor expansion valve installed in the liquid pipe, wherein the outdoor heat exchanger serves as a condenser when the switching valve is in a first state, and serves as an evaporator when the switching valve is in a second state, wherein the controller increases a system evaporating pressure, which is a pressure of refrigerant suctioned into the compressor, before switching the switching valve from the first state to the second state, and decreases a system condensing pressure, which is a pressure of refrigerant discharged from the compressor, before switching the switching valve from the second state to the first state, wherein when a cooling load of indoor heat exchangers of the plurality of indoor heat exchangers that serve as an evaporator is greater than a heating load of an indoor heat exchanger of the plurality of indoor heat exchangers that serves as a condenser, the controller is configured to control the switching valve to switch to the first state, and wherein when a heating load of indoor heat exchangers of the plurality of indoor heat exchangers serving as a condenser is greater than a cooling load of an indoor heat exchanger of the plurality of indoor heat exchangers serving as an evaporator, the controller is configured to control the switching valve to switch to the second state.

17. The air conditioner of claim 16, wherein an opening degree of each of the low pressure valves is adjustable, and wherein a target of the system evaporating pressure is set to a lowest target evaporating pressure among target evaporating pressures of the indoor heat exchangers serving as the evaporator.

18. The air conditioner of claim 17, wherein the target evaporating pressure of each of the indoor heat exchangers serving as the evaporator is calculated based on a temperature of an indoor space in which the respective indoor heat exchanger is installed, a user's set temperature for the indoor space, and pipe temperature information of the respective indoor heat exchanger.

19. The air conditioner of claim 16, wherein an opening degree of each of the high pressure valves is adjustable, and wherein a target of the system condensing pressure is set to a highest target condensing pressure among target condensing pressures of the indoor heat exchangers serving as the condenser.

20. The air conditioner of claim 19, wherein the target condensing pressure of each of the indoor heat exchangers serving as the condenser is calculated based on a temperature of an indoor space in which the respective indoor heat exchanger is installed, a user's set temperature for the indoor space, and pipe temperature information of the respective indoor heat exchanger.

* * * * *